United States Patent [19]
Vinciarelli et al.

[11] Patent Number: 5,088,016
[45] Date of Patent: Feb. 11, 1992

[54] VOLTAGE-COMPLIANT DC-DC CONVERTER MODULE

[75] Inventors: Patrizio Vinciarelli, Boston; Jay M. Prager, Tyngsboro, both of Mass.

[73] Assignee: VLT Corporation, San Antonio, Tex.

[21] Appl. No.: 583,863

[22] Filed: Sep. 17, 1990

[51] Int. Cl.$^5$ .............................................. H02M 3/00
[52] U.S. Cl. ........................................ 363/15; 363/47; 363/95
[58] Field of Search ......................... 363/15, 39, 44, 45, 363/47, 48, 95

[56] References Cited

U.S. PATENT DOCUMENTS

| | | | |
|---|---|---|---|
| 4,415,959 | 11/1983 | Vinciarelli | 363/21 |
| 4,685,041 | 8/1987 | Bowman et al. | 363/47 |
| 4,788,634 | 11/1988 | Schlecht et al. | 363/48 |
| 4,800,479 | 1/1989 | Bupp | 363/48 |
| 4,888,675 | 12/1989 | Kumar et al. | 363/47 |

Primary Examiner—Jeffrey Sterrett
Attorney, Agent, or Firm—Fish & Richardson

[57] ABSTRACT

A voltage-compliant power converter module which converts power from an input source for delivery to a load, the load being external to the voltage-compliant converter module and including an external filter capacitance of value Ce for providing ripple filtering of the load voltage delivered to the load, the load being connected to the voltage-compliant converter module via load interconnections external to the voltage-compliant power converter module, the load interconnections being characterized by a total parasitic load inductance of value L1. The converter module includes input terminations for connection to the input source and output terminations for connection to the load interconnections. Switching power conversion circuitry is connected to receive input power via the input terminations from the input source, the power conversion circuitry including one or more switching devices, the switching devices delivering a pulsating voltage waveform at switching frequencies within a nominal operating range. Power delivery circuitry receives the pulsating voltage waveform from the switching power conversion circuitry and delivers power to the load via the output terminations and the load interconnections, the power delivery circuitry including an output capacitor, of value Co, and output inductor, of value Lo, and output interconnections between the output capacitor and the output terminations, the output interconnections and the output terminations being characterized by a total parasitic output inductance of value Lp. The output inductor, the external filter capacitor, the output capacitor, the parasitic load inductance, and the parasitic output inductance defining a first breakpoint frequency, f1, which is lower than the lowest switching frequency in the nominal operating range.

12 Claims, 13 Drawing Sheets

VOLTAGE-COMPLIANT DC-DC CONVERTER MODULE

BACKGROUND OF THE INVENTION

This invention relates to switching power converters.

As operating speeds of electronic systems have increased, so have the performance demands imposed upon system power sources. Voltages supplied to individual active components in high performance electronic assemblies must be maintained within relatively narrow ranges (for example, +/−5%) even though the current drawn by any device may change by as much as an order of magnitude in a fraction of a microsecond. Maximum performance is demanded of the power source when a large number of devices change state essentially simultaneously. Under these circumstances, the relative power drawn from the power source by the circuit assembly can change from 10% to 100% of full load, and aggregate current slew rates can exceed 20 Amperes-per-microsecond. Trends toward higher speed devices which operate at lower voltage levels can be expected to further increase the rate-of-change of current which must be accommodated by the power source.

Known modular DC-DC switching power converters are intended to deliver an essentially constant voltage, Vo, to a load. Such converters include switching circuitry, control circuitry and an output filter. The switching circuitry, which includes one or more switching devices, converts energy from an input source into a periodic pulsating voltage waveform (at a converter operating frequency which may either be fixed or variable) which is delivered to the output filter. The average value of the pulsating voltage waveform can be varied by means of control signals delivered to the switching circuitry. The output filter, which consists of an output inductor (Lo) in series with an output capacitor (Co), is characterized by a first breakpoint frequency, $$f1 = \frac{1}{2\pi \sqrt{LoCo}},$$

which is set well below the lowest operating frequency of the converter. By connecting the load across the output capacitor, the output filter delivers the average value of the pulsating voltage waveform to the load but attenuates the large time-varying component of the pulsating waveform so that its contribution to the output voltage (i.e. the output ripple) is small in comparison to the desired value, Vo, of the load voltage. By sensing the voltage across the load, and adjusting the control signals delivered to the switching circuitry, the control circuitry attempts to maintain the output voltage at a constant value, Vo, as the input source and load vary. Converters so described are generally self-contained assemblies with terminals (e.g. pins, wires) for making electrical connections to the input source and the load. In some cases the converter is mounted directly on the electronic assembly which forms the load; in others it may be physically separate from the assembly.

Besides acting as an element for reducing output ripple, the module output capacitor is also intended to act as an energy storage medium for minimizing output voltage variation in response to sudden changes in load current. In principle, the peak output voltage deviation in response to large changes in load current can be controlled through appropriate sizing of the output capacitor. In practice, however, this is not the case, since some parasitic inductance unavoidably exists in the interconnections between the output capacitor and the load. The value of this parasitic inductance will depend on the geometry of both the interconnections between the output capacitor and the converter output terminals (Lp), and the interconnections between the converter terminals and the load (L1). When the current drawn by the load exhibits a high rate-of-change, a voltage drop equal to the total parasitic inductance, Lp+L1, multiplied by the rate-of-change of current will develop across the parasitic inductance. Since the output capacitor voltage cannot change instantaneously, the load voltage will be reduced in an amount equal to the voltage drop across the parasitic inductances, and, for a rapid change in load, this voltage deviation can be quite significant. For example, a rate-of-change of load current of 20 Amperes-per-microsecond will produce a 2 volt drop across 100 nanohenries of parasitic inductance. In a 5 Volt system, this would represent 40% deviation in load voltage. To achieve a more acceptable deviation of 0.1 Volt would require that the total parasitic inductance be lower than 5 nanohenries.

One prior art method of attempting to overcome the effect of the parasitic inductances is to place additional capacitance, outside of the converter, across the load. This creates several problems. First, by increasing the aggregate output capacitance, the response time of the converter is degraded. Second, use of too much capacitance may cause closed-loop instability of the converter. Finally, if small amount of external capacitance are used, a rapid change in load current will excite an oscillatory ringing of the load voltage. This ringing, which is associated with the circuit loop formed by the external capacitor, the output capacitor internal to the converter, and the parasitic inductances, can be relatively large in comparison to the nominal output voltage.

The effects of parasitic inductance on load voltage result directly from the placement of the output capacitor within the modular converter. As was intended, the internal output capacitor acts as an essentially noncompliant voltage source when the converter is confronted with changes in load current. Unfortunately, instead of limiting the compliance of the voltage across the load, it limits the compliance of the voltage which feeds the parasitic inductances interposed between the capacitor and the load. If no external capacitor is used with a prior art converter, the noncompliance of the voltage across the internal output capacitor exposes the load to the full effect of the voltage drop induced in the parasitic inductances by rapid changes in load current. Whether or not an external capacitor is used, the presence of an internal output capacitor acts as a barrier to corrective control response. If, for example, the converter module responds to a change in load by increasing the current flowing in the module output inductor, the voltage slew rate limitation imposed by the internal output capacitor will delay a similar increase in current flowing in the parasitic inductances toward the load.

SUMMARY OF THE INVENTION

The present invention concerns a DC-DC converter module which, when used in combination with an external capacitor connected directly across the load, overcomes the impediments to control repsonse and maintenance of stable load voltage which are inherent to prior art converters. By placing essentially all of the output capacitance outside of the converter module, directly across the load, parasitic inductances associated with interconnections between the converter and the load are effectively lumped into the output inductance of the converter and constraints on the slew rate of the voltage feeding the parasitics are eliminated. Hence, a converter module according to the present invention is referred to as a voltage-compliant DC-DC converter module. Rapid changes in load current can be supported by the external output capacitor without flowing in the parasitic inductances, and all of the current delivered by the voltage-compliant converter in response to the change in load (i.e. the current flowing in the module output inductor) will flow through to the external output capacitor and load. As a result, deviations in load voltage observed in prior art systems due to rate-of-change of current flow in the parasitic inductances can be eliminated with no degradation in module response time. Also, the value of the external output capacitor used with a converter according to the present invention need be no larger than the minimum amount required to achieve some desired combination of ripple reduction and maximum output voltage deviation associated with worst case changes in load. In one embodiment of the present invention an output capacitor which is included within the module is limited to a capacitance level which does not materially affect the compliance of the voltage feeding the parasitic inductances. In other embodiments, no output capacitance is included within the converter module.

Thus, in general, the invention features a voltage-compliant power converter module which converts power from an input source for delivery to a load, the load being external to the voltage-compliant converter module and including an external filter capacitance of value Ce for providing ripple filtering of the load voltage delivered to the load, the load being connected to the voltage-compliant converter module via load interconnections external to the voltage-compliant power converter module, the load interconnections being characterized by a total parasitic load inductance of value L1. The converter module includes input terminations for connection to the input source and output terminations for connection to the load interconnections. Switching power conversion circuitry is connected to receive input power via the input terminations from the input source, the power conversion circuitry including one or more switching devices, the switching devices delivering a pulsating voltage waveform at switching frequencies within a nominal operating range. Power delivery circuitry receives the pulsating voltage waveform from the switching power conversion circuitry and delivers power to the load via the output terminations and the load interconnections, the power delivery circuitry including an output capacitor, of value Co, an output inductor, of value Lo, and output interconnections between the output capacitor and the output terminations, the output interconnections and the output terminations being characterized by a total parasitic output inductance of value Lp. The output inductor, the external filter capacitor, the output capacitor, the parasitic load inductance, and the parasitic output inductance defining a first breakpoint frequency, f1, given by the expression on the right side of equality 21a, which is lower than the lowest switching frequency in the nominal operating range. The output capacitance, Co, of the output capacitor included within the power delivery circuitry is less than (a) the expression on the right side of inequality 42, and (b) the expression on the right side of inequality 43.

Preferred embodiments include the following features. There is control circuitry for setting the average value of the pulsating voltage waveform by controlling the switching of the switching devices based on the value of an electrical parameter delivered to the control circuitry. There are sense terminations for delivering the electrical parameter to the control circuitry. The control circuitry sets the average value of the pulsating voltage waveform delivered by the switching devices to the power delivery circuitry based upon a comparison of a setpoint voltage, Vsp, to an electrical parameter delivered to the control circuitry, the electrical parameter being indicative of the load voltage. The output capacitance is zero. Some or all of the output inductance, Lo, is external to the converter module.

Other advantages and features will become apparent from the following description of the preferred embodiment and from the claims.

DESCRIPTION OF THE PREFERRED EMBODIMENT

We first briefly describe the drawings.

Figure 9:
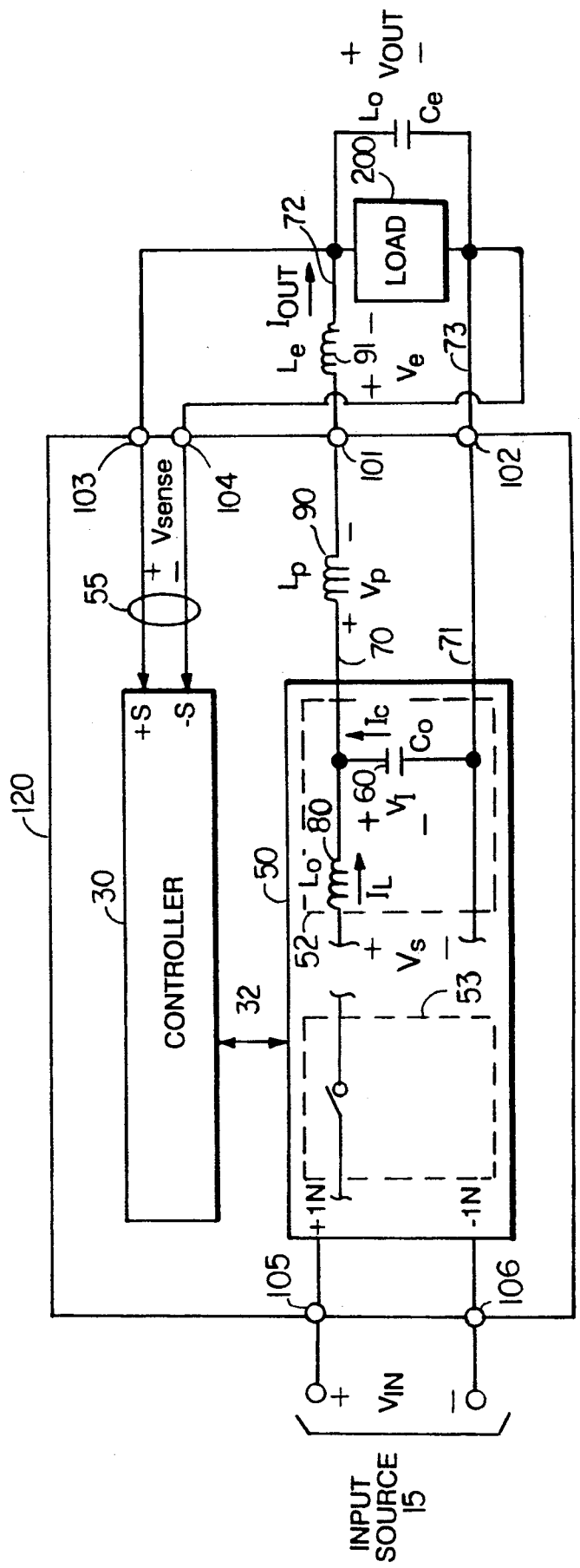
FIG. 9 is a block diagram of an electronic system comprising a prior art DC-DC converter module, an external capacitor and a load.
Figures 12A, 12B, 12C:
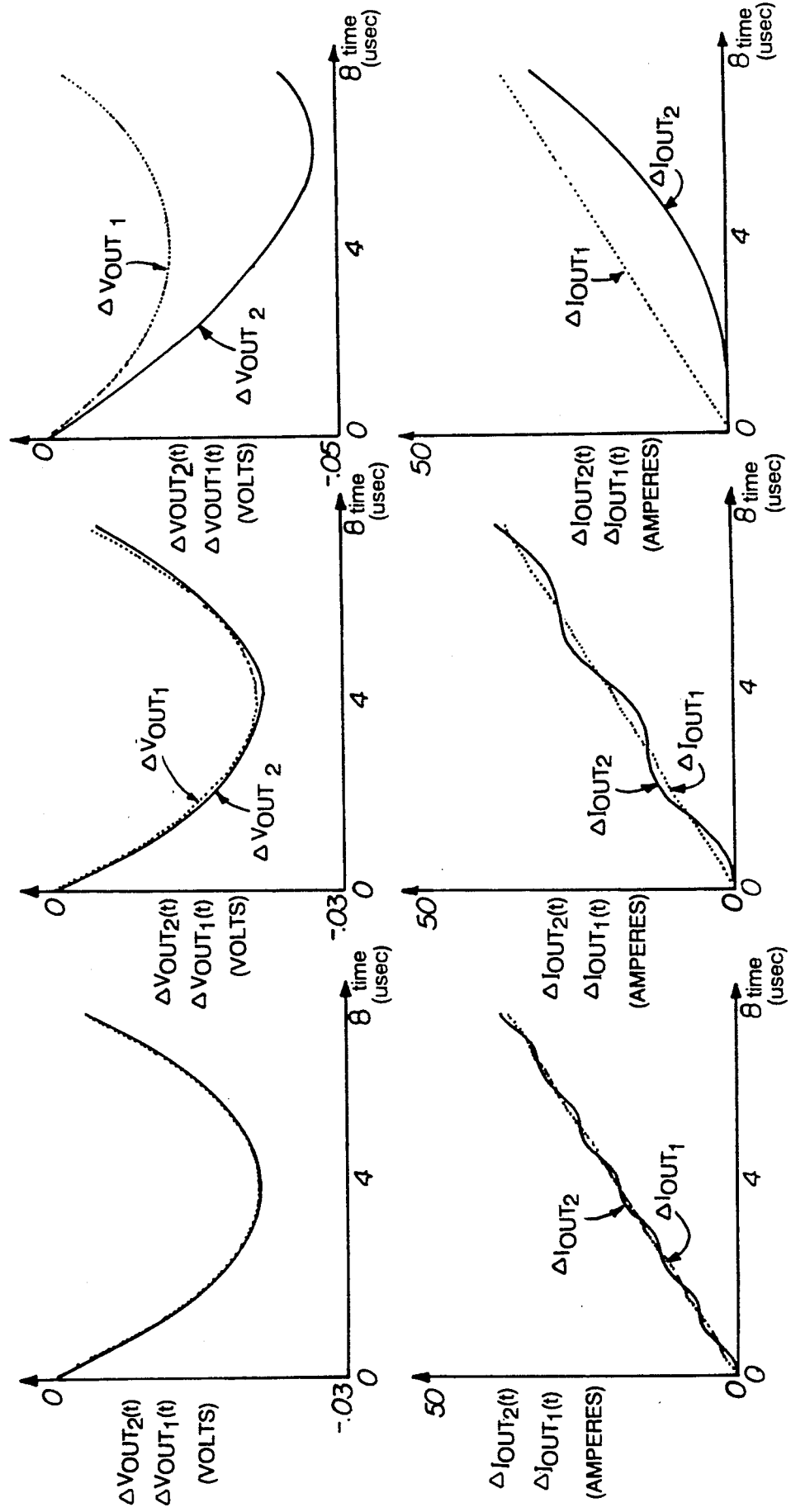

FIGS. 12A, 12B, and 12C show waveforms of voltages and currents in the system of FIG. 9 for different values of internal output capacitor.

Figure 13A:
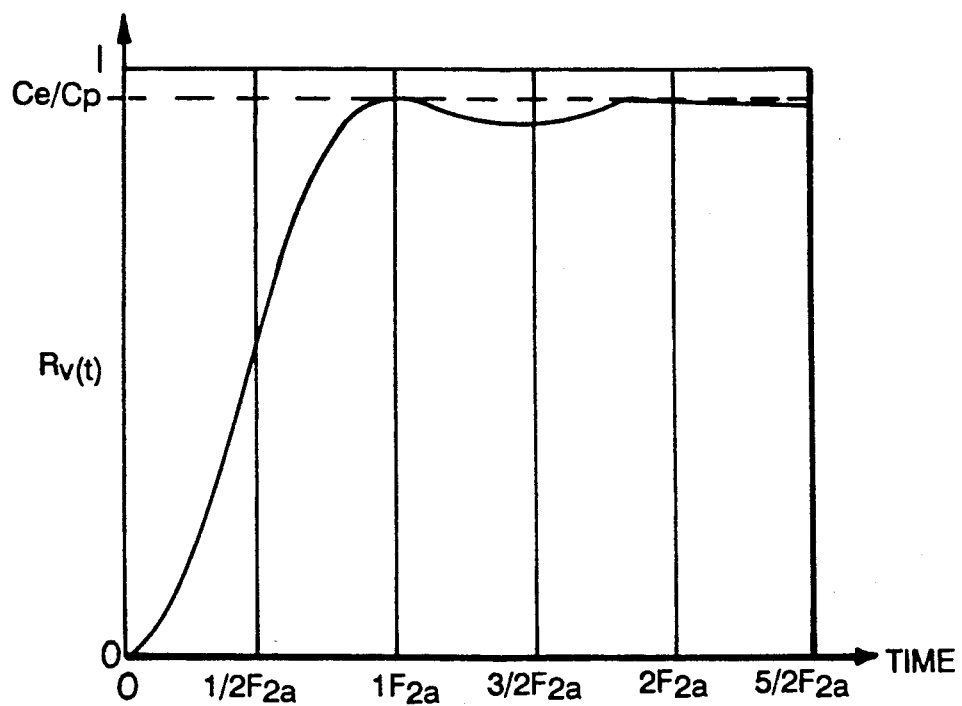
Figure 13B:
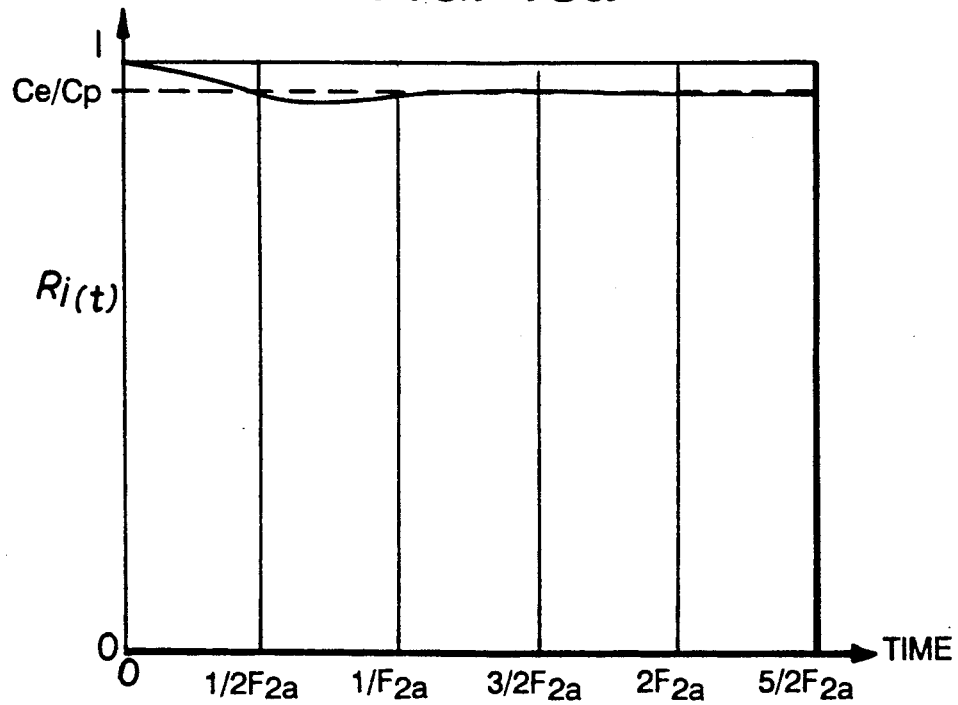

FIGS. 13A and 13B show modulation factors which relate the output voltage response of a two stage filter to the output voltage response of a single stage filter.

Figure 14:
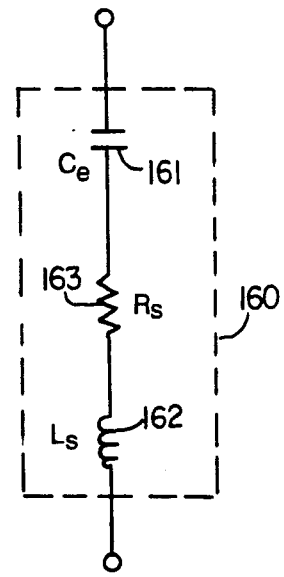

FIG. 14 is the equivalent circuit of a physically realizable output capacitor which includes parasitic resistance and inductance.

STRUCTURE AND OPERATION

Figure 1:
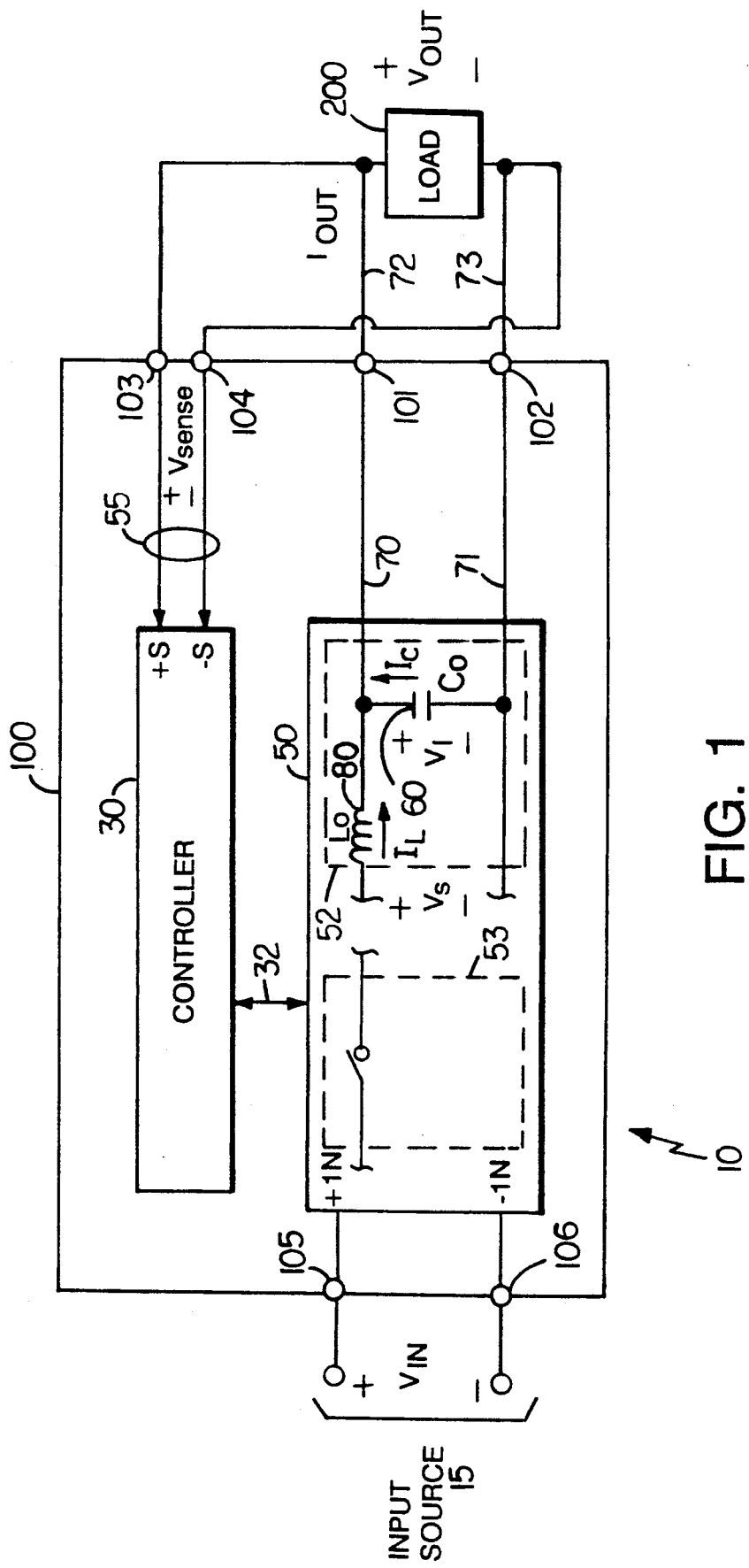
FIG. 1 is a block diagram of an electronic system comprising a prior art DC-DC converter module and a load.
Figure 2A:
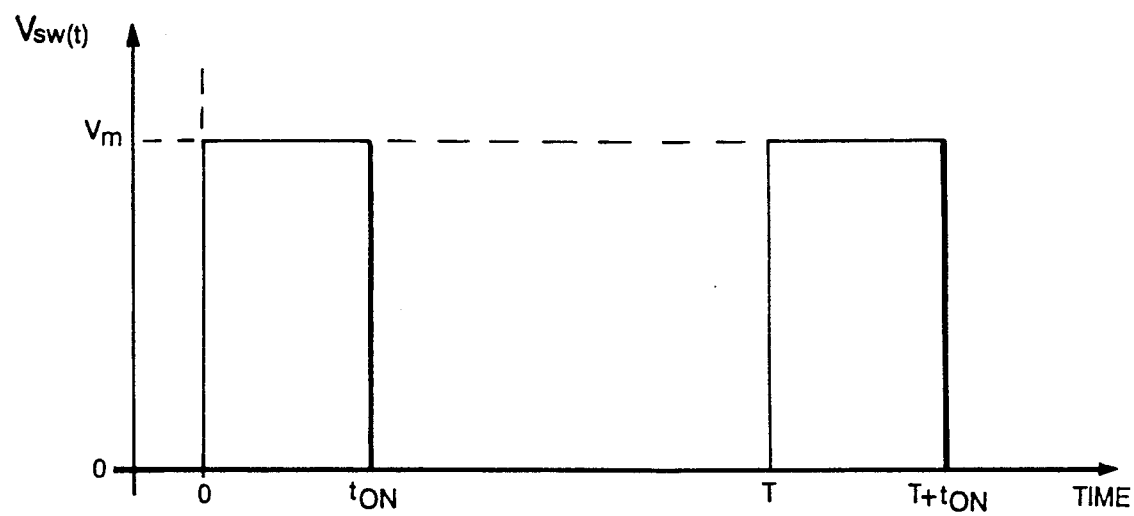
FIGS. 2A and 2B show waveforms typical of those which are delivered to the output filter in certain kinds of switching power converters.
Figure 2B:
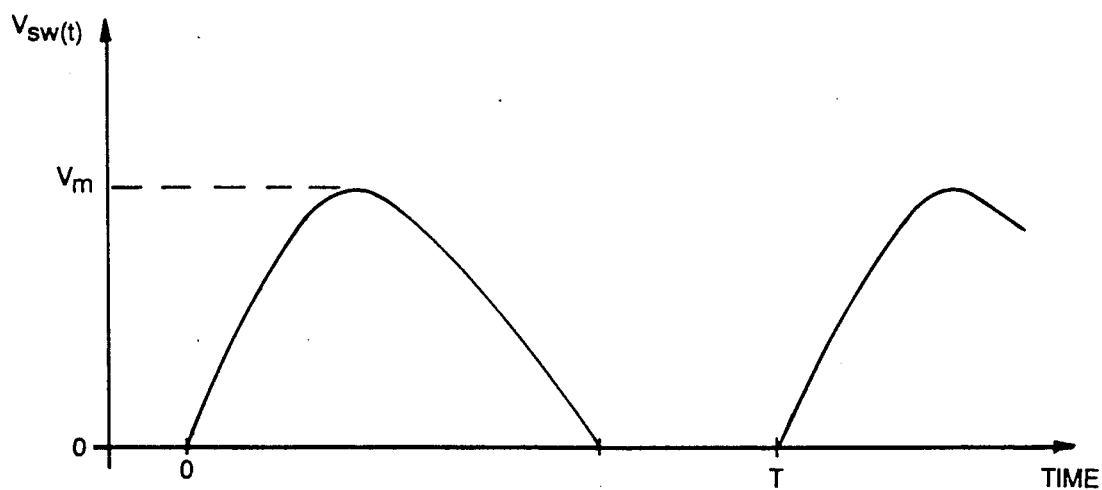

FIG. 1 is a block diagram of an electronic system 10 consisting of a prior art DC-DC converter module 100 and a load 200. The prior art DC-DC converter module 100 accepts input power from a source 15, at an input voltage Vin, and delivers power to the load 200, at an output voltage Vout(t). All electrical connections to the prior art DC-DC converter module 100 are made via terminals 101-106 (e.g. pins, wires) which are part of the module 100. The DC-DC converter module 100 includes power conversion circuitry 50 and control circuitry 30 to which connections are made via the various terminals 101-106 as shown in the Figure. The power conversion circuitry 50, which is of the switching type, includes one or more switching devices 53 (one of which is shown in the Figure), and an output filter 52 consisting of an output capacitor 60, of value Co, and an output inductor 80, of value Lo. The values of the output inductor 80, Lo, and the output capacitor 60, Co, define a characteristic first breakpoint frequency, $$f1 = \frac{1}{2\pi \sqrt{LoCo}},$$

for the output filter. Control signals 32 delivered to the power conversion circuitry set the times at which the switching devices 53 are turned on and off, thereby controlling the average value of the pulsating voltage waveform, Vsw(t), delivered to the output filter 52. Pulsed waveforms typically found in such power conversion circuity 50 are illustrated in FIGS. 2A and 2B. In FIG. 2A the waveform Vsw(t) is essentially rectangular, having a peak value Vm and a minimum value of essentially zero volts. The average value of Vs(t) is adjusted by either varying the operating frequency (i.e. fop=1/T) at which the switches 53 are turned on and off while maintaining the on-time, ton, constant; by maintaining the operating frequency, fop, constant and varying the on-time, ton; or by varying both the operating frequency and the on time. FIG. 2B shows a waveform, Vsw(t) typical of the kind found in a power converter which transfers energy to the load in a series of quantized energy transfer cycles (e.g. a resonant converter, or a zero-current switching converter). In such converters the average value of Vsw(t) is adjusted by varying the operating frequency at which the switches 53 are turned on and off, or by varying the relative timing at which the switches 53 are turned on and off, or both. The output filter 52 extracts the average value of the waveform Vsw(t) so that an essentially DC voltage may be delivered to the load. The control circuitry 30 has sense inputs 55 and switch control circuitry (not shown) for generating the control signals 32 which are delivered to the power conversion circuitry 50. A setpoint voltage (not shown), representative of the desired value of converter output voltage, Vo, is either delivered to, or included within, the control circuitry. If the sense terminals 103, 104 are connected to the load and the sense voltage, Vsense=Vout(t), measured at the sense connections 55, differs from the desired value of output voltage, Vo, (as represented by the setpoint voltage) the control circuitry 30 will, depending on the specific topology of the power conversion cicuitry 50, adjust either the operating frequency, or the relative timing at which the switching devices 53 are turned on and off, or both. If, as shown in FIG. 1, the input source 15 is connected to the input terminals 105, 106, and the sense terminals 103, 104 and the output terminals 101, 102 are connected to the load 200, the prior art DC-DC converter module 100 will maintain the average voltage at the output terminals 101, 102 equal to the desired value of voltage output, Vo, as both the load 200 and the value of source voltage, Vin, vary.

The basic function of the converter of FIG. 1 is to maintain the instantaneous value of output voltage, Vo(t), within relatively narrow limits (for example, within +/−5% of the desired steady-state output voltage Vo). Two primary contributions to instantaneous variations in Vout(t) are the output ripple and the closed-loop response of the converter to changes in load current, Iout(t). Output ripple, which is the contribution of the harmonic components of the pulsating waveform Vsw(t) (i.e. components in the frequency spectrum of Vsw(t) which are integer multiples of the operating frequency) to the output voltage, Vout(t), can be minimized by setting the first breakpoint frequency, f1, of the output filter to a suitable value well below the lowest necessary operating frequency of the converter. Having set the first breakpoint frequency, the closed-loop response of the converter is dependent on several factors which include the first breakpoint frequency, the frequency response characteristics of the control circuitry, the operating frequency of the converter, the magnitude and speed of the change in load current, and closed-loop stability considerations. Because the first breakpoint frequency is set well below the lowest operating frequency of the converter, the converter output is essentially equal to the response of the output filter to the fundamental component of the pulsating waveform Vsw(t)(i.e. the component in the frequency spectrum of Vsw(t) which is at zero frequency).

Figure 3:
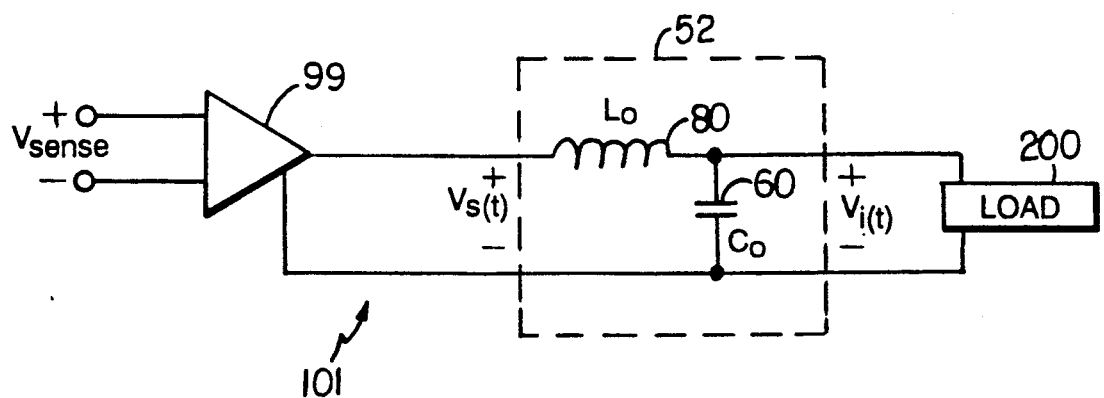
FIG. 3 is a model of the system of FIG. 1, comprising a compensated controller and an output filter, which is used for describing the open-loop frequency response of the system.
Figure 4A:
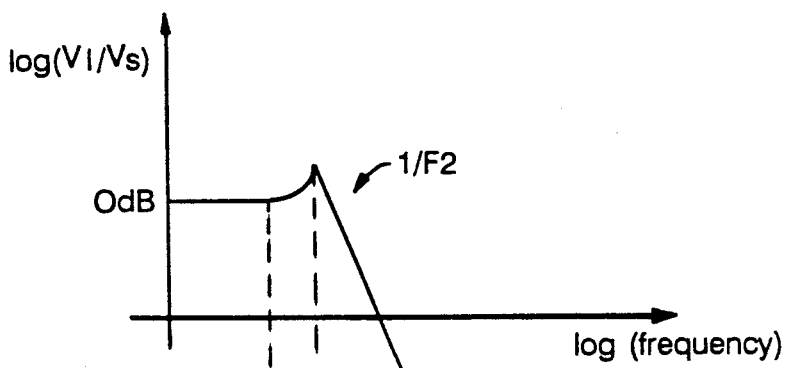
FIGS. 4A-4F show the frequency dependent open-loop gain and phase characteristics of the system of FIG. 1 using the model of FIG. 3.
Figure 4C:
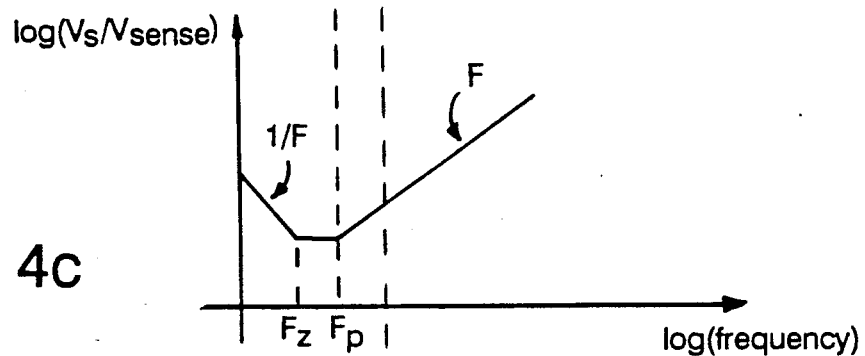
Figure 4E:
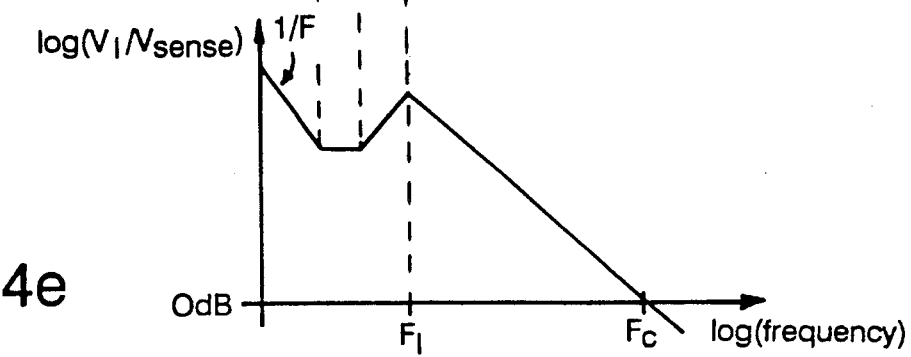
Figure 4B:
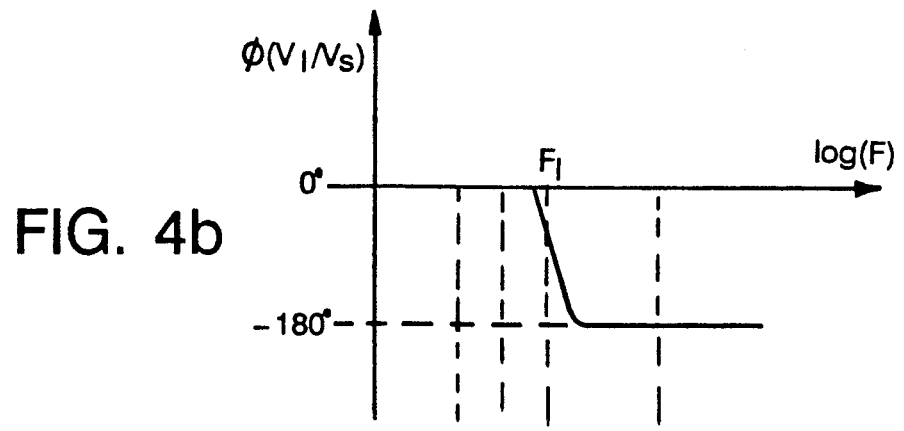
Figure 4D:
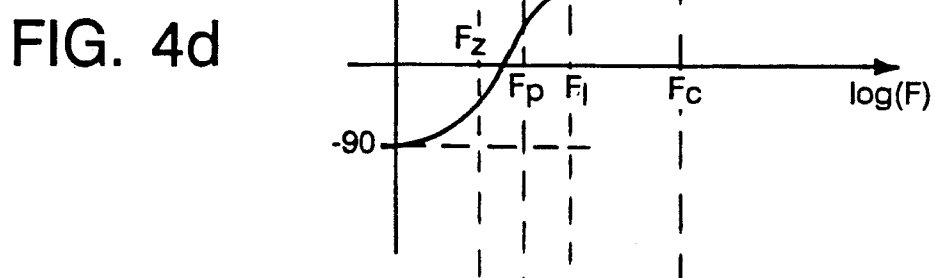
Figure 4F:
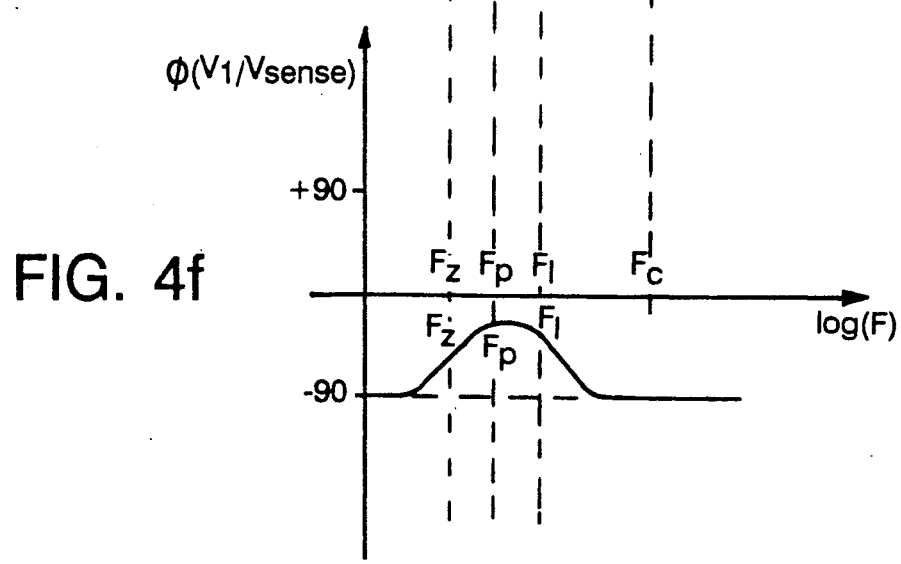

Methods for optimizing closed-loop "small signal" response while ensuring stable closed-loop operation are well known and can be summarized with reference to FIGS. 3 and 4A through 4F. In FIG. 3 the converter is modeled as a compensated controller 99 and an output filter 52. The compensated controller 99 models the response of the fundamental component of Vsw(t) (shown in the Figure as Vs(t)) to changes in Vsense and includes the effects of all of the elements of the converter 100 of FIG. 1 which are in the signal processing path between the sense terminals 103, 104 and the input to the output filter 52. The open loop frequency response of the converter is the product of the responses of the compensated controller 99 and the output filter 52 (including any frequency response effects of the load 200). The gain and phase response of the output filter 52 are shown in FIGS. 4A and 4B respectively. Below the first breakpoint frequency, f1, the output filter 52 gain is essentially unity and the phase shift is essentially zero. Above the first breakpoint frequency, however, the output filter 52 attenuation increases as the square of the frequency and the phase shift is essentially 180 degrees (assuming ideal components). While high open-loop gain is desirable in terms of maintaining tight closed-loop regulation over output voltage, classical stability criteria require that, for negative feedback systems, the open-loop gain become less than one before the open-loop phase shift exceeds 180 degrees. One way of tailoring the frequency response of the compensated controller 99 is shown in FIGS. 4C and 4D. In the Figures, the compensated controller 99 has high open-loop gain at low frequencies, thereby ensuring tight regulation of the DC output voltage under steady-state conditions, whereas at frequencies approaching the first breakpoint frequency the controller 99 introduces phase lead (and an increase in gain which is proportional to frequency) which compensates for the phase lag and attenuation of the output filter 52. The aggregate open-loop gain and phase (FIGS. 4E and 4F) meets the criteria for closed loop stability and exhibits a cutoff frequency (i.e. the frequency at which the open loop gain equals unity), fe, above the first breakpoint frequency of the output filter 52. The cutoff frequency (which must generally be below one half the lowest operating frequency of the converter due to "sampling" effects of the pulsating waveform Vsw(t) represents the small signal "bandwidth" of the closed loop converter. Below the cutoff frequency the relatively high values of open-loop gain provide for active closed-loop attenuation of disturbances and output impedance. Above the cutoff frequency, active control effects are relatively ineffective.

The model of FIGS. 3 and 4 is useful for predicting converter response only to the extent that there are no constraints on the dynamic range of signals within the loop. In practice this is rarely true. With reference to FIG. 2A, for example, the strength of the fundamental component (i.e. the average value) of Vsw(t) can, at most, vary between zero and Vm volts, which, in practical converters, is typically limited to above twice the nominal output voltage, Vo. If, with reference to FIGS. 1 and FIGS. 3 and 4, a change in Vsense calls for a dynamic response which exceeds the peak limit, Vsmax, on Vs(t), then the input to the output filter will "saturate" at Vsmax and the output response will follow the open-loop response of the filter to Vsmax until the difference between Vout(t) and Vsense (the "error voltage") comes back within the small signal dynamic range of the converter circuitry. The maximum rate of change of output current that the converter can accommodate within its active control range can be approximated by noting that the current, IL(t), (FIG. 1) in the output inductor 80 cannot change instantaneously. A change in load current, Iout(t), must initially be supported by the output capacitor 60 which will start to discharge as it supplies the incremental output current. The controller 30 will sense the change in output voltage resulting from the discharge of the capacitor 60 and will respond by increasing the average value of Vs(t) as a means of increasing the current in the output inductor 80. As noted above, the rate at which the current can be changed in the output inductor 80 is constrained by the limit, Vsmax, on the maximum average value of Vs(t). Thus, the maximum rate at which the current IL(t) can be increased in the output inductor 80 is limited to:

$$\frac{dIL(t)}{dt} = \frac{(Vsmax - Vo)}{Lo} = DI_{max}. \quad (1)$$

To a first approximation, changes in output current which exhibit rates-of-change lower than $DI_{max}$ can be considered to be within the limits of the active control response of the converter 100. Output current changes which exceed the $DI_{max}$ limit, however, must be supported by the output capacitor 100 until sufficient time has elapsed for effective control action to occur.

With reference to FIG. 1, the size of the output capacitor 60 required to prevent the converter 100 output voltage from varying more than $\Delta$Vo volts from a nominal value of Vo volts, when the converter is confronted with a rapid increase in load current, $\Delta$Io, can be estimated by assuming that the current Iout(t) increases instantaneously and that the controller 30 responds by instantly increasing the average value of VS(t) to its maximum value Vsmax. Under these circumstances, the current, IL(t), in the output inductor 80 will start to increase linearly at a rate, $DI_{max}$, given by Equation 1:

$$\Delta IL(t) = DI_{max} \cdot t. \quad (2)$$

The current in the capacitor 60, Ic(t), equals the difference between the output current, Iout(t), and the inductor current, $\Delta$IL(t). Therefore, after the step change in current:

$$Ic(t) = \Delta Io - DI_{max} \cdot t. \quad (3)$$

This current will cause the voltage across the capacitor to decrease by an amount, $$\Delta V_1(t) = \frac{1}{Co} \int_0^t (\Delta Io - DI_{max} \cdot t) dt = \frac{\Delta Io \cdot t}{Co} - \frac{DI_{max} \cdot t^2}{2 \cdot Co}, \quad (4)$$

until, at a time t1, the change in inductor current, $\Delta$IL(t), equals the change in load current, $\Delta$Io, and the capacitor current (Equation 3) becomes zero:

$$\Delta Io = DI_{max} \cdot t1, \quad (5)$$

and $$t1 = \frac{\Delta Io}{DI_{max}}. \quad (6)$$

At time t1 the change in capacitor voltage is:

$$\Delta V_1(t1) = \frac{\Delta Io^2}{2 \cdot Co \cdot DI_{max}}. \quad (7)$$

Rearranging Equation 7, the estimated value of output capacitance required to keep $\Delta V_1(t1) = \Delta V$ is:

$$Co = \frac{\Delta Io^2}{2 \cdot \Delta V \cdot DI_{max}}. \quad (8)$$

If, for example, the output voltage of the power converter 100 is 5 volts, the output inductor 80 is 50 microhenrys, Vs(t) is constrained to a maximum value of Vsmax=10V, and it is desired to keep the maximum change in output voltage, $\Delta$V, within 0.2 V (4% of the nominal 5 V output) for a 20 ampere step change in output current, $\Delta$Io, then, using the preceding formula for Co, an output capacitor 60 of approximately 10,000 microfarads would be required to "hold up" the output voltage. From the formula for t1, above, the minimum output voltage would be reached approximately 200 microseconds after the step change is current. A 50 microhenry inductor might typically be used in a 100 Watt "square-wave" converter (i.e. of the kind which produces a Vs(t) waveform as shown in FIG. 2A) operating at a constant operating frequency of 50 KHz. It should be noted that the combination of a 50 microhenry inductor and a 10,000 microfarad capacitor results in a first breakpoint frequency equal to 225 Hz and a DImax of 0.1 ampere-per-microsecond. By operating at higher frequencies, and by utilizing variable frequency control, quantized-energy converters (for example, zero-current switching converters of the kind described in Vinciarelli, U.S. Pat. No. 4,415,959, incorporated herein by reference) utilize smaller output inductors 80 and require proportionally lower values of output capacitance 60. For example, for the same conditions described above (including an equivalent Vm=10V), a zero-current switching converter having an 2 microhenry output inductor and using a 2000 microfarad output capacitor would exhibit a maximum output voltage variation of 0.04 Volts just 8 microseconds after the step change in current, and would exhibit a first breakpoint frequency of 2.5 Khz and a DImax of 2.5 amperes-per-microsecond. Thus, for a given set of large signal response requirements, higher operating frequencies mitigate toward smaller output capacitors and, with reference to FIG. 4, to greater small signal bandwidth, fc, and improved small signal response. Also, where large changes in output current are anticipated, the value of the output capacitor 60 will generally depend primarily on output voltage response requirements and this value of capacitance will generally be ample in terms of being able to contribute to filter attenuations which are consistent with low output voltage ripple.

Figure 5:
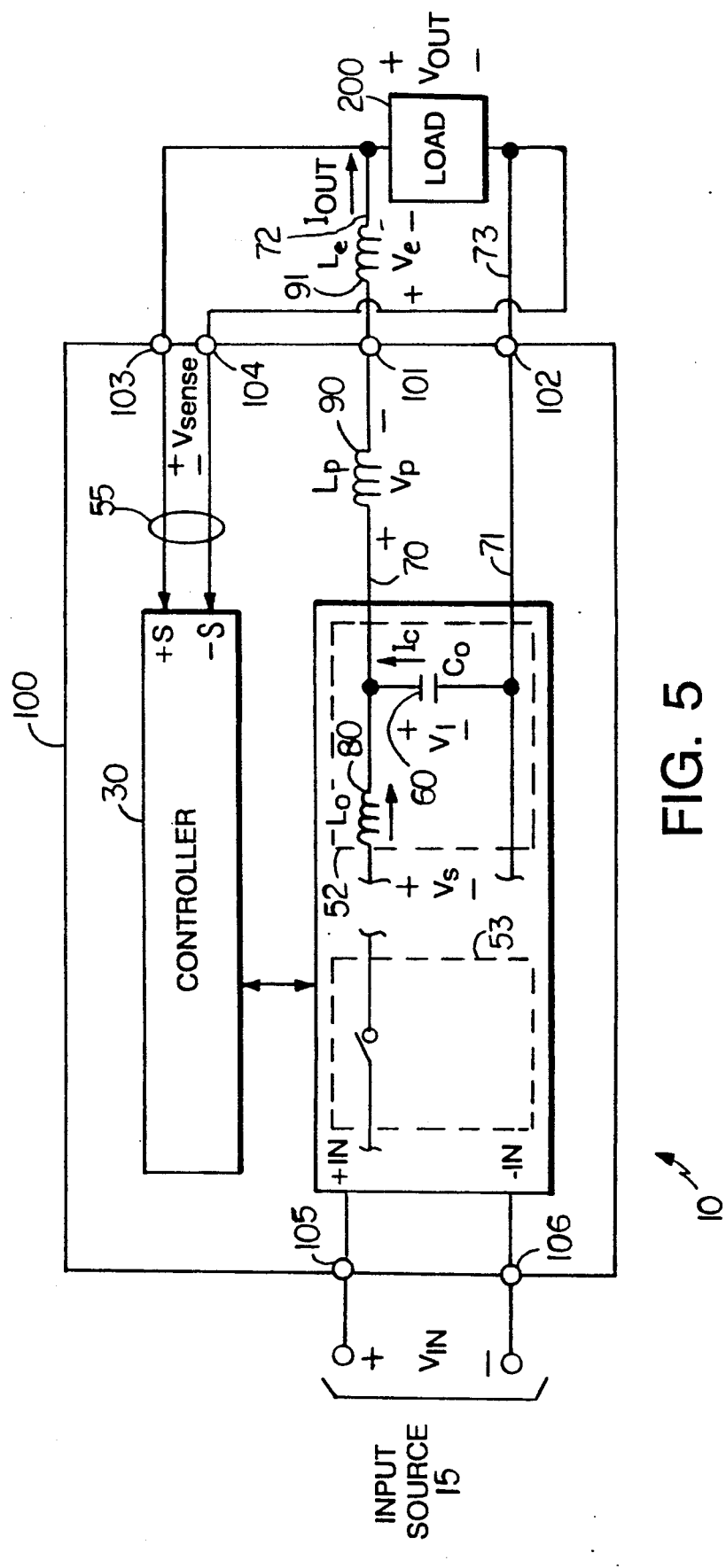
FIG. 5 is a block diagram of the electronic system of FIG. 1 disclosing parasitic inductances associated with connections internal to the prior-art converter and with the load connections.

Use of the output capacitor 60 as a transient buffer assumes, however, that no other circuit effects will cause a significant drop in voltage between the capacitor 60 and the load 200. For rapidly changing loads this assumption cannot be taken for granted, since some parasitic inductance is unavoidable in the conducting paths between the output capacitor 60 and the load 200. FIG. 5 reproduces the system 10 of FIG. 1, but discloses this parasitic inductance as consisting of a parasitic output inductance 90, of value Lp, associated with the conducting paths 70, 71 between the output capacitor 60 and the output terminals 101, 102, and a parasitic load inductance 91, of value Ll, associated with the conducting paths 73, 74 between the output terminals 101, 102 and the load 200. The values of these parasitic inductances 90, 91, Lp and Ll, depend on the length and geometry of both the conducting paths 70, 71, 73, 74 and the output terminals 101,102, and are generally smaller than the value, Lo of the output inductor 80.

The effect of the parasitic inductances 90, 91 in response to a rapid change in load current is shown in FIG. 6. Prior to time t1 both the output voltage (FIG. 6D), Vout(t), of the converter module 100, and the voltage across the output capacitor 60 (FIG. 6C), V1(t), are at a constant, regulated, value of Vo volts and both the output current, Iout(t) (FIG. 6A), and the current in the output inductor 80, IL(t), are at a constant value of Io amperes. At time t1, the load current, Iout(t), FIG. 6A) starts to ramp linearly at a rate $$\frac{dIout(t)}{dt} = D = \frac{I1 - Io}{t2 - t1} \text{ amperes-per-second,} \quad (9)$$

where $D >> DI_{max}$ (Equation 1). Since the current in the output inductor 80, IL(t), cannot change instantaneously, the initial response of the converter 100 to a rapid change in load current can be closely approximated by assuming that the output inductor 80 current IL(t) remains constant, at the value IL(t)=Io, throughout the interval during which the load current changes. Using this approximation, the current in the capacitor 60 will equal $$Ic(t) = Iout(t) - Io, \quad (10)$$

and the voltage at the load 200, Vout(t), will be equal to the difference between the voltage across the output capacitor 60, $V_1(t)$, and the sum of the voltages across the parasitic inductances 90, 91, Vp(t) and $V_L(t)$, $$Vout(t) = V_1(t) - (Vp(t) + V_L(t)), \quad (11)$$

where $$Vp(t) + V_L(t) = (Lp + Ll)\frac{dIout(t)}{dt}. \quad (12)$$

Figure 6A:
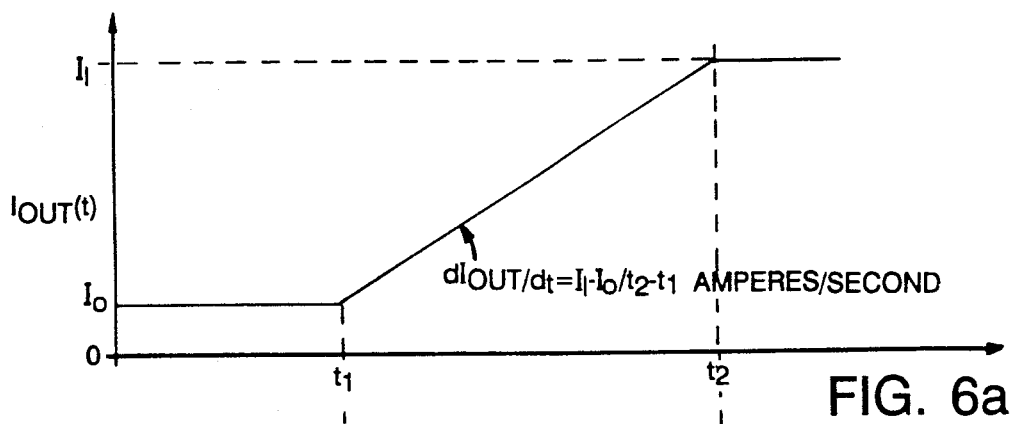
FIGS. 6A-6D show waveforms which described the response of the system of FIG. 5 to a rapid change in load current.
Figure 6B:
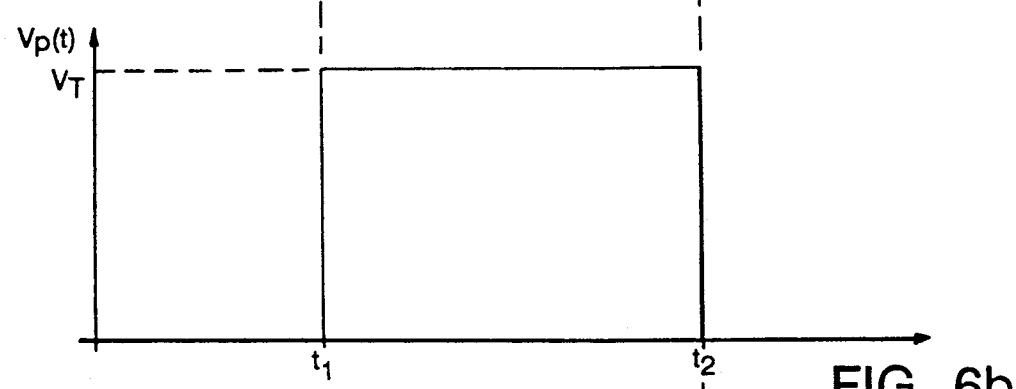
Figure 6C:
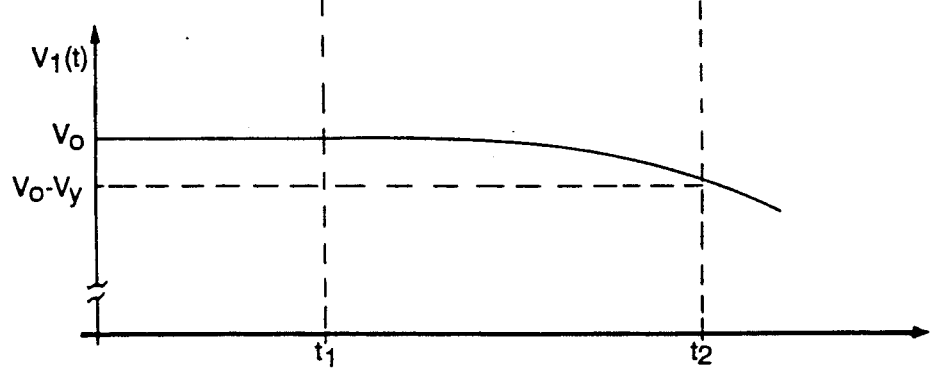
Figure 6D:
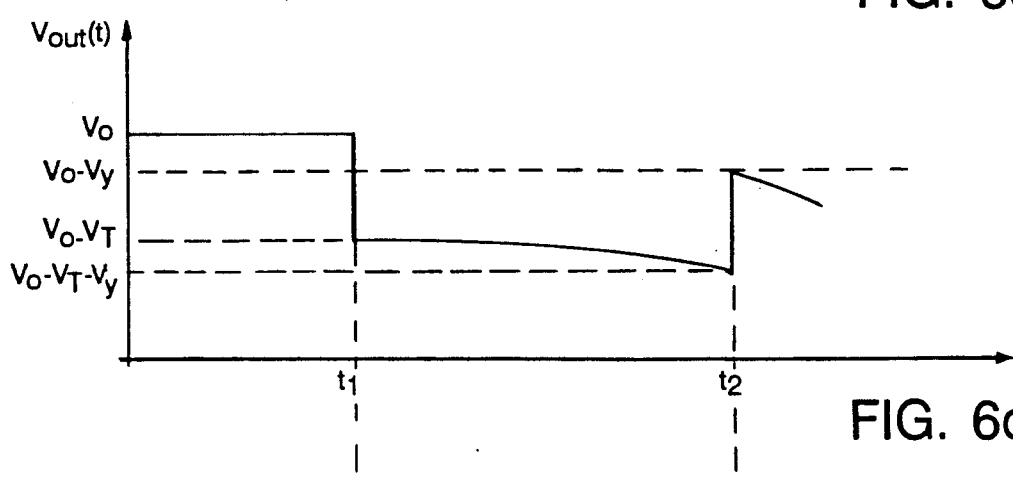

In accordance with Equations 9 and 12, a step change in voltage, $$Vp(t) + V_L(t) = (Lp + Ll)D = V_T, \quad (13)$$

will appear instantaneously at time t1 across the parasitic inductances 90, 91 (FIG. 6B). Since the voltage across the output capacitor 60 cannot change instantaneously (FIG. 6C), this step change in voltage across the parasitic inductance will appear as a step decrease in the output voltage, Vout(t) (FIG. 6D). Between t1 and t2 the voltage developed across the parasitic inductor 90 remains constant and, in accordance with Equation 10, the output capacitor 60 supplies part of the load current, $$Ic(t) = D \cdot (t - t1) \quad t1 < t < t2, \quad (14)$$

causing the output capacitor 60 to discharge:

$$V_1(t) = Vo - \frac{1}{Co}\int_{t1}^{t} Ic(t)dt = Vo - \frac{D}{2Co}(t - t1)^2 \quad (15)$$

$$t1 < t < t2$$

At time t2, the output capacitor 60 has discharged by an amount equal to $$Vy = \frac{D}{2Co}(t2 - t1)^2, \quad (16)$$

and the peak deviation, Vd, in the output voltage is:

$$Vd = Vo - Vout(t2) = V_T + Vy = \quad (17)$$

$$D \cdot (Lp + Ll) + \frac{D}{2Co}(t2 - t1)^2$$

At time t2, the load current stabilizes at a value I1 (FIG. 6A). Since the rate of change of current becomes zero, the voltage across the parasitic inductances 90, 91, Vp(t2+) + $V_L$(t2+), (FIG. 6B) goes to zero, and the output voltage, Vout(t2+), steps up to a value Vout(t2+) = Vo−Vy. After time t2, the incremental current, I1 - Io, will initially discharge the output capacitor 60 at a constant rate equal to $$\frac{dV_1(t)}{dt} = -\frac{(I1 - Io)}{Co} \quad t > t2 \quad (18)$$

until such time as the control response of the converter module 100 starts to charge the output capacitor 60 back to a value of Vo.

In the modular converter topology of FIG. 5, in which an output capacitor 60 is included within the converter 100, even a small amount of parasitic output inductance 90 can create difficulty. Assume again, for example, that the desired output voltage, V0, is 5 Volts, the desired limits on peak transient change in output voltage, Vd, are ±4% (±0.20 Volts), and the load current changes by 20 Amperes in a 1 microsecond time period (i.e. the rate-of-change of load current, D, is 20 Amperes-per-microsecond). A total parasitic output inductance, Lp+Ll, of only 10 nanoHenries would account for the entire allowable peak output voltage transient (i.e. $V_T$=0.2 V, from Equation 7) throughout the interval during which the current is changing. In comparison, if the parasitic inductances 90, 91 were zero, the change in voltage across the 2000 microfarad output capacitor 60 at the end of the current ramp would be, from Equation 10, only 0.005V. A total parasitic output inductance value at or below 10 nanoHenries is much lower than values typically encountered in practice, and attempting to achieve such low levels of parasitic output inductance would not only be difficult, it would be inefficient in terms of space and cost.

Although one of the intended purposes of the output capacitor 60 was to reduce the output voltage compliance of the prior art converter module 100 in response to rapid changes in load current, its purpose is defeated by placing it within the converter module 100. By effectively acting as a noncompliant voltage source at the input to the parasitic inductances 90, 91 inclusion of the capacitor 60 within the module 100 causes the full effect of the parasitic inductances 90, 91 to be felt as the load 200 (Equations 11 and 17 and FIGS 6B and 6D). Examination of Equation 17 reveals that no matter how large the value, Co, of the output capacitor 60 is made, the peak output voltage deviation, Vd, cannot be reduced below a value of Vdmin=$V_T$=D.(Lp+Ll). Furthermore, the value $V_T$ depends only upon the rate of change of current, and will be the same irrespective of whether the incremental change in current, I1-Io, is large or small. Also, inclusion of the capacitor 60 acts as a barrier to corrective control response. If, for example, in response to the output current ramp of FIG. 6A, the voltage $V_1(t)$ (FIG. 5) could, at time t1, instantly be increased by $V_T$=D.Lp volts, then the effect of the parasitic inductances 90, 91 on the converter output voltage could be completely eliminated. By acting as a sink for increased current supplied by the output inductor 80 the capacitor limits the voltage slew rate at the input to the parasitic inductors 90, 91 and prevents the possibility of any such control action.

Figure 7:
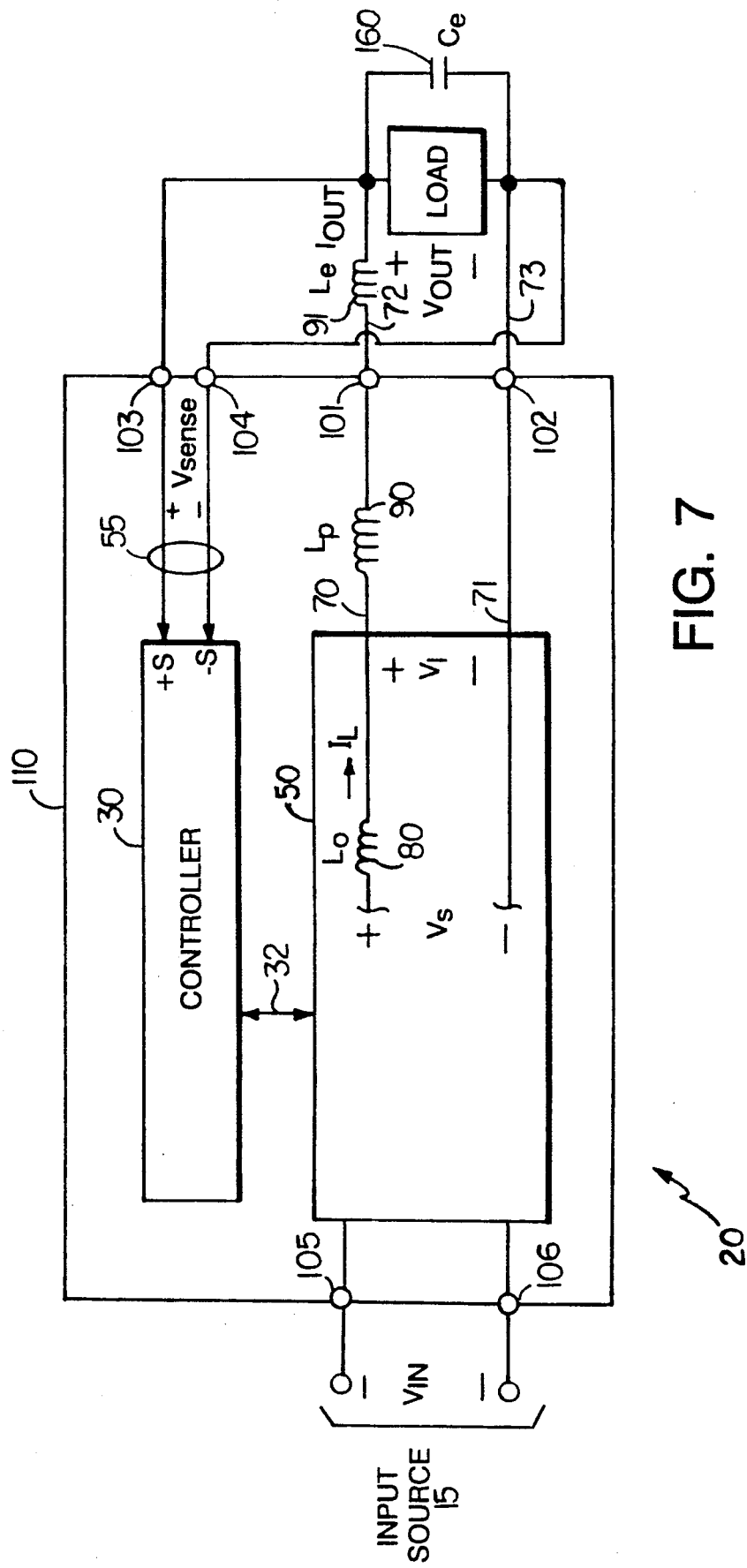
FIG. 7 is a block diagram of an electronic system comprising a voltage-compliant DC-DC converter module, an external capacitor and a load.

FIG. 7 is a block diagram of an electronic system 20 consisting of an input source 15, a DC-DC converter module 110 (which has no internal output capacitor), an external output capacitor 160 of value Ce, and a load 200. Excepting the fact that the converter 110 of FIG. 7 does not contain the output capacitor 60 which was included within the converter of FIG. 5, the converters 100, 110 may otherwise be considered to be identical. Although the converter module 110 of FIG. 7 has a first breakpoint frequency which is infinite (because the amount of capacitance included within the converter module is zero), the first breakpoint frequency of the system 20 of FIG. 7 is, by inspection, $$f_1 = \frac{1}{2\pi \sqrt{(Lo + Lp + Ll)Ce}}$$ (which, for Lo >> (Lp + Ll), is closely approximated by $f_1 = \frac{1}{2\pi \sqrt{LoCe}}$ ).

The response of the converter 110 of FIG. 7 to a rapid change in load current can be inferred by comparing the topologies of FIGS. 5 and 7. By placing the output capacitor 160 external to the converter 110 of FIG. 7, the parasitic inductances 90, 91 have, in effect, been lumped with the output inductor 80 to form a total equivalent output inductor of value Loeff-=Lo+Lp+Ll. Since the values of the parasitic inductances 90, 91 are generally much smaller than the value of the output inductor 80 this will have a minimal effect on the first breakpoint frequency, f1, and the control response of the converter (i.e. per Equation 2). Since the parasitic inductances 90, 91 are not interposed between the capacitor 160 and the load 200, transient changes in load current, Iout(t) will flow in the capacitor but not in the parasitic inductances 90, 91. As a result, for the same change in load current used to describe the response of the converter 100 to FIG. 5 (i.e. as in FIG. 3A and shown again in FIG. 8A), and all other conditions being the same, the variation in the output voltage of the converter of FIG. 7 will be, in accordance with Equation 15:

$$V\text{out}(t) = Vo - \frac{1}{Ce} \int_{t1}^{t} Ic(t)dt = Vo - \frac{D}{2Ce}(t - t1)^2 \qquad (19)$$

$$t1 < t < t2$$

Figure 8A:
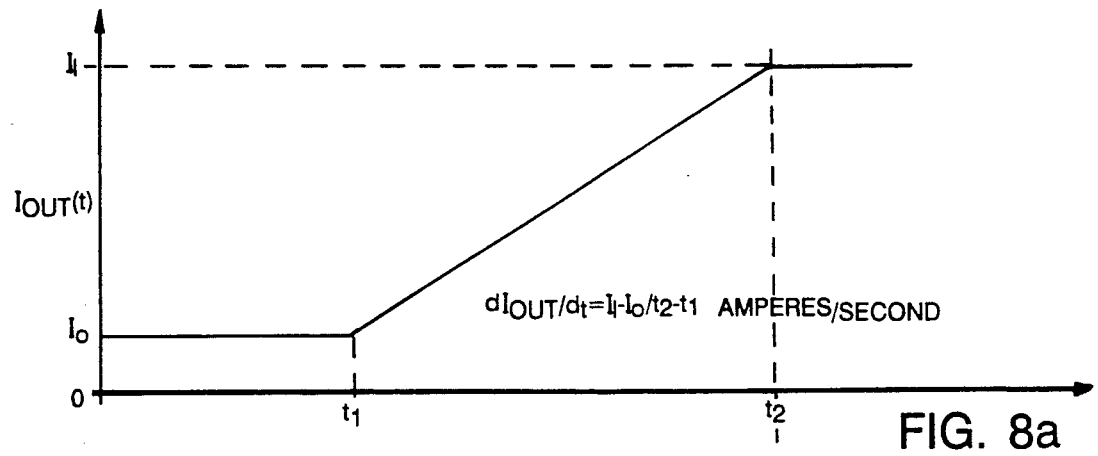
FIGS. 8A and 8B show waveforms which describe the response of the system of FIG. 7 to a rapid change in load current.
Figure 8B:
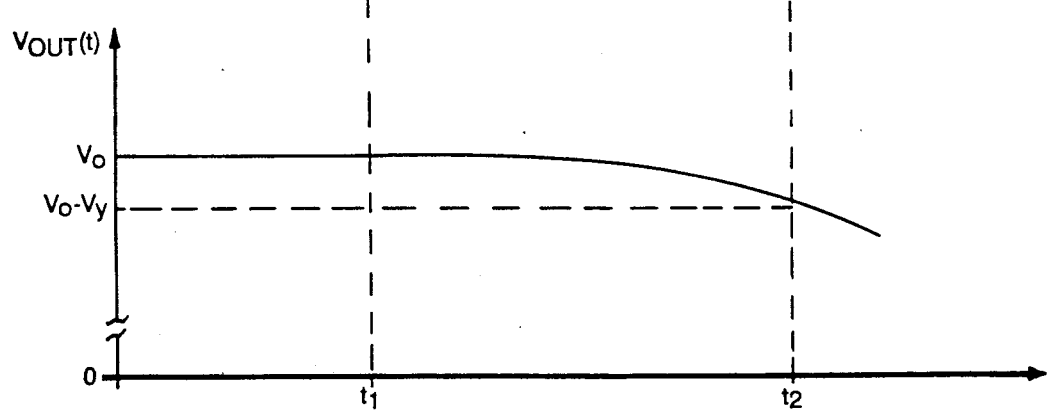

At time T2, the external capacitor 160 will have discharged by an amount equal to, $$Vy = \frac{D}{2Ce}(t2 - t1)^2 \qquad (20)$$

which, as shown in FIG. 8B, represents the peak output voltage deviation, Vd=Vy, for the converter 110 of FIG. 7. The response of the converter 110 of FIG. 7 is shown in FIG. 8B. Using the same values used in the example given for FIG. 5 (Ce=2000 microfarads; D=20 Amperes-per-microsecond, t2−t1=1 microsecond), the total deviation at time t2 is 0.005 V. By locating the output capacitor 160 external to the converter 110 the step reduction in converter output voltage caused by the rate of change of current flowing in the parasitic output inductances 90, 91 (i.e. as shown in FIGS. 6B and 6D for the converter 100 of FIG. 5) is eliminated. It is to be noted that since the converter 110 to FIG. 7 contains no internal output capacitor there is no inherent limitation on the rate of change of voltage at the input to the parasitic inductance 90, as there was for the converter of FIG. 5. Therefore, the constraints on control which were inherent to the prior art converter 100 of FIG. 5 do not exist in the converter 110 of FIG. 7.

The essential difference between the prior art DC-DC converter module 100 of FIG. 5 and the DC-DC converter module 110 of FIG. 7 is that the prior art converter 100 includes an output capacitor 60, while the converter 110 of FIG. 7 does not. The compliance of the voltage, V1(t), in the converter 100 of FIG. 5 is limited by the presence of the capacitor 60; no such compliance limitation is imposed in the converter of FIG. 7. Therefore, a converter module of the kind shown in FIG. 7 is called a voltage-compliant DC-DC converter module. In application, both converters 100, 110 are intended to deliver an essentially constant value of DC voltage to the load 200. To this end, both the "internal" output capacitor 60 of FIG. 5 and the external capacitor 160 of FIG. 7 are intended to serve the same purpose; each sets the first breakpoint frequency to a value below the lowest necessary operating frequency of the converter as a means of minimizing output ripple, and each is intended to "hold up" the load voltage when the converter is confronted with large or rapid changes in load current. However, by having the capacitor 160 at the point of load 200, the system 20 of FIG. 7 benefits from the noncompliance of the capacitor's 160 voltage to changes in load current. In contrast, the noncompliance of the output capacitor 60 in the system 10 of FIG. 5 is a drawback: the effects of series parasitics 90, 91 between the capacitor 60 and the load 200 are fully felt at the load. Said another way, placement of the output capacitor 60 internal to the converter 100 of FIG. 5 requires that the output voltage decrease if current is to increase in the parasitic inductances 90, 91. No such restriction exists in the converter of FIG. 7.

A conventional solution to adapting a prior art converter to applications which exhibit rapid changes in load current is shown in FIG. 9. In FIG. 9, the system 30 consists of a pair art DC-DC converter module 120 (which includes an internal output capacitor 60), an external output capacitor 160 of value Ce, and a load 200. The internal output capacitor 60 is of a value, Co, which is sufficient to meet the both the ripple and control response requirements of the application. However, due to the presence of the parasitic output inductance 90, the external output capacitor 160 is added to perform the same bypassing function as the external output capacitor 60 of the system of FIG. 7 (i.e. rapid changes in load current, Iout, flow in the external output capacitor 60 and bypass the parasitic inductance 90). This solution of FIG. 7 is an improvement over the solution of FIG. 9 for the several reasons.

First, addition of an external capacitor 160 increases both the overall size and cost of the system by increasing the total system capacitance, Co+Ce, to a value greater than that which would otherwise be required (i.e. Co).

Second, addition of an external capacitor 160 creates the equivalent of a two-stage filter at the output of the converter, the first stage consisting of the output inductor 80 and the output capacitor 60, and the second stage consisting of the parasitic inductances 90, 91 and the external capacitor 160. As a result, the system 30 is characterized by two system breakpoint frequencies which are very closely approximated by:

$$f1a = \frac{1}{2\pi \sqrt{(Lo + Lp + Ll) \cdot (Co + Ce)}} \quad (21a)$$

and $$f2a = \frac{1}{2\pi \sqrt{\frac{(Lp + Ll) \cdot Lo}{(Lp + Ll + Lo)} \cdot \frac{Co \cdot Ce}{(Co + Ce)}}} \quad (21b)$$

Assuming that Lo is much larger than the sum of the parasitics, Ll+Lp, then these frequencies are essentially equal to:

$$f1a = \frac{1}{2\pi \sqrt{Lo \cdot (Co + Ce)}} \quad (21c)$$

and $$f2a = \frac{1}{2\pi \sqrt{(Lp + Ll) \cdot \frac{Co \cdot Ce}{(Co + Ce)}}}. \quad (21d)$$

Figure 10A:
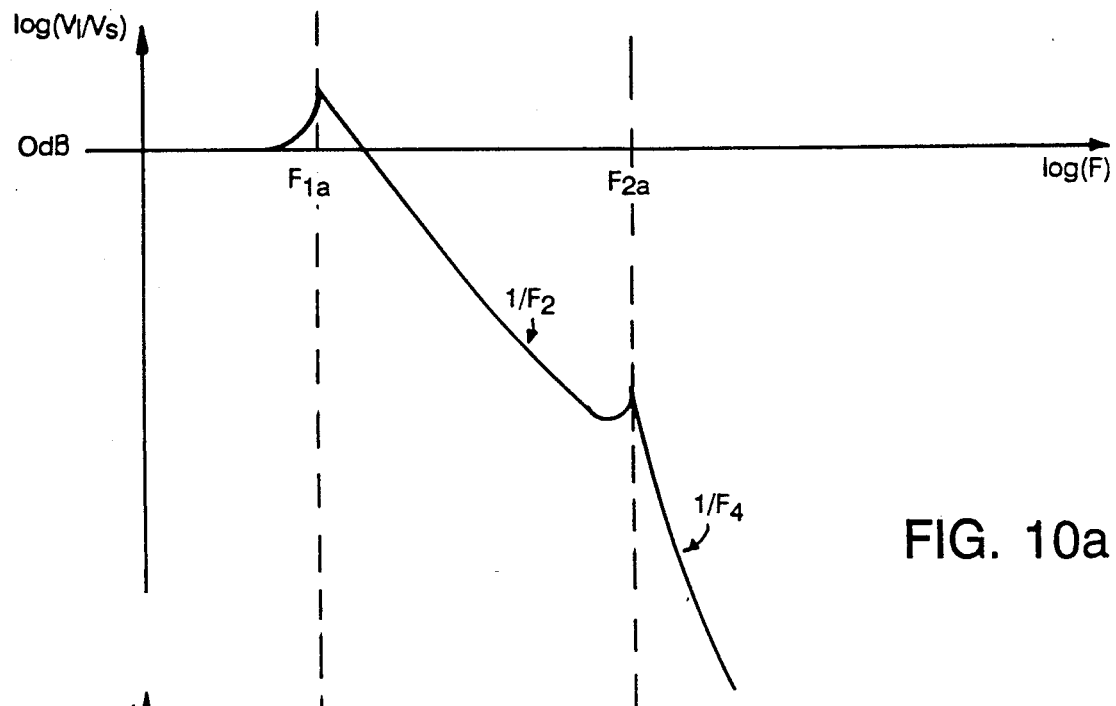
FIGS. 10A and 10B show the frequency dependent gain and phase characteristics of the two-stage filter which forms a part of the system of FIG. 9.

The first system breakpoint frequency, f1a, results from the combination of the output inductor 80 and the total output capacitance Co+Ce. The second system breakpoint frequency, F2a, represents the resonant frequency of the closed loop formed by the two capacitors 60, 160 and the parasitic inductances 90, 91. Compared with the single stage filter response shown in FIGS. 4A and 4B, the two stage filter of FIG. 9 exhibits the gain and phase characteristic shown in FIGS. 10A and 10B, respectively. One effect of the use of extra external capacitance is that the first system breakpoint frequency, f1a, of the system 30 of FIG. 9 is reduced relative to the first breakpoint frequency, f1, of the system 20 of FIG. 7 (which, for comparison, would include an external capacitor 160 of value Co and would have a first breakpoint frequency, f1, equal to $$\frac{1}{2\pi \sqrt{LoCo}}).$$

Figure 10B:
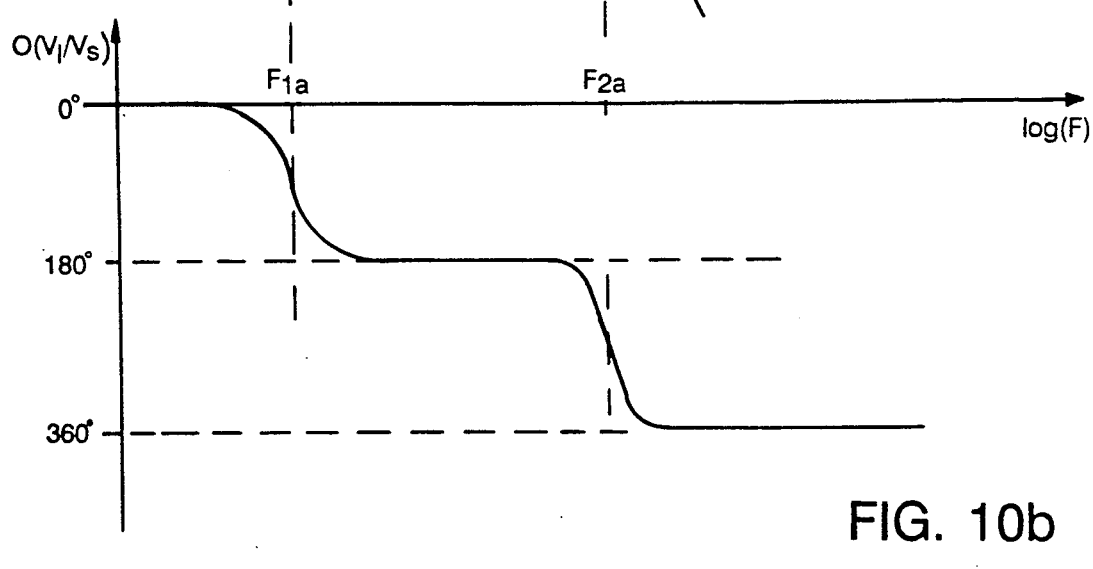

With reference to FIGS. 10 and 4, this reduction in the first system breakpoint frequency will reduce the cutoff frequency, fc, of the system and will slow system response. Since the compensation of the converter (i.e. as, for example, in FIGS. 4C and 4D) is not generally adjustable, and since the effect of the second system breakpoint frequency is to added an additional 180 degrees of open-loop phase shift at frequencies above f2a (FIG. 10B), selection of a value for the external capacitor 160 which results in a second system breakpoint frequency, f2a, which is close to or below the cutoff frequency of the system 30 will result in an unstable closed-loop system. Even if a value of external capacitor 160 is chosen which does not cause instability, a rapid change in load current will excite a resonant current flow in the loop formed by the two capacitors 60, 160 and the parasitic inductances 90, 91. The resulting variation in output voltage, $\Delta Vout1(t)$, is very closely approximated by the response to a step change in load current:

$$\Delta Vout1(t) = \frac{\Delta Io}{(Co + Ce)} \cdot t + \quad (22)$$

$$\left( \frac{\Delta Io \cdot Co}{2\pi f2a \cdot (Co + Ce) \cdot Ce} \right) \cdot \sin(2\pi f2a \cdot t)$$

The first term in Equation 22 is the discharge of the aggregate output capacitance and is the same as predicted by Equation 18 for a system with a single stage filter. The sinusoidal second term, however, is caused by resonant current flow in the external capacitor 160 and is not insignificant. Addition of 100 microfarads of external capacitance 160 (Ce) outside of a prior art converter which includes a 2000 microfarad internal capacitor 60 (Co), in the presence of an interposing total parasitic inductance (Lp+Ll) 90, 91 of 50 nanohenries, will result in output voltage ringing having a peak sinusoidal excursion of 0.42 volts if excited by a 20 ampere change in load current (ΔIo). The ringing will be at a the second system breakpoint frequency, F2a, of 73 KHz. Since, as previously noted, stability considerations demand that f2a be above the cutoff frequency of the converter, this ringing cannot be actively controlled. Equation 22 indicates that the peak sinusoidal voltage can be decreased by increasing the external capacitor. However, aside from earlier objections to size and cost, this will necessarily reduce the cutoff frequency and impair control performance. The most efficient solution is to use no more capacitance than is demanded by the requirements of the application, and this is most efficiently achieved in the system of FIG. 7.

Figure 11:
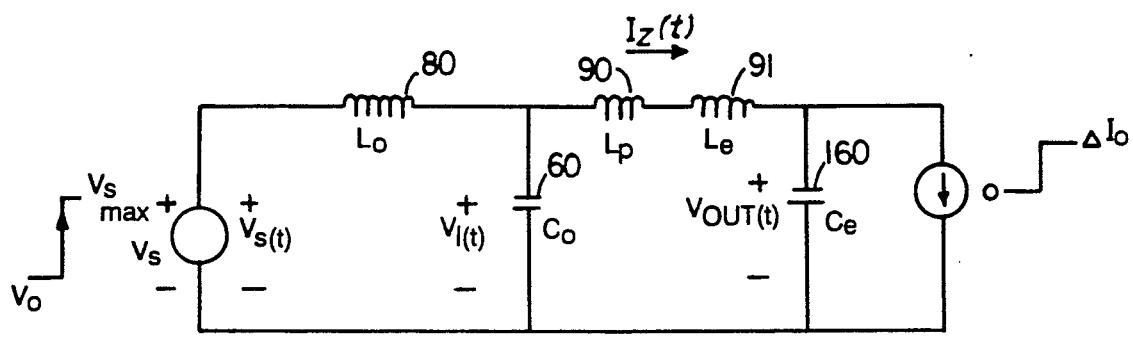
FIG. 11 shows a model for determining the output voltage response of the system of FIG. 9.

While Equation 22 indicates that a large ratio, Co/Ce, of internal output capacitance to external capacitance will adversely affect the converter's response to changes in load current, it also indicates that if the bulk of the capacitance is external, so that Co/Ce is small, the effect of the two stage filter becomes less significant. If, for example, the capacitor values used in the example in the preceding paragraph were reversed (i.e. Co=100 microfarads and Ce'2000 microfarads) the second system breakpoint frequency, f2a, a would remain unchanged at 73 KHz, but the peak ringing at the converter output would be reduced to 1 millivolt. This is consistent with an intuitive expectation that reducing the amount of internal capacitance used in the system 30 of FIG. 9 should result in performance which converges on that predicted for the system 20 of FIG. 7 (assuming that both have the same value, Ce, of external capacitor 160), and suggests that a certain amount of essentially nonfunctional internal output capacitance can be accommodate within the voltage-compliant converter 110 of FIG. 7 without significantly impacting its system performance or overlaying prior art. The effect of using a small amount internal output capacitance can be quantified by comparing the output voltage response of a converter which contains an internal output capacitor to the response of a converter which does not. Using the same argument used to derive Equations 1 through 8, the variation in output voltage of the converter 120 of FIG. 9 in response to a step change in load current, ΔIo, can be approximated by assuming that the control circuitry 30 responds to the change in load by instantly increasing Vs(t) to its maximum value Vsmax. As shown in FIG. 11, the large signal response is then the response of the two stage filter to a simultaneous application of a step change, ΔIo, in load current, Iout(t), and a step change in filter input voltage, Vs(t), from a value Vo to a value Vsmax. Assuming the F2a>>f1a, the response of the filter during the time period of interest (e.g. for an elapsed time period, small in comparison with 1/f1a, during which the peak output voltage excursion and reconvergence back to a value of Vo will occur) is described by the following equations (where the numerical subscript (i.e. ΔVout2) indicates the two stage filter):

$$\Delta V_{out2}(t) = \Delta V_{v2}(t) + \Delta V_{i2}(t) \quad (23)$$

$$\Delta I2_2(t) = \Delta I_{v2}(t) + \Delta I_{i2}(t) \quad (24)$$

where $$\Delta V_{v2}(t) = +\frac{(Vm - Vo) \cdot t^2}{2 \cdot Ls \cdot Cp}\left(1 - \frac{\sin^2\left(\frac{\omega_h t}{2}\right)}{\left(\frac{\omega_h t}{2}\right)^2}\right) \quad (25)$$

$$\Delta V_{i2}(t) = -\frac{\Delta Io \cdot t}{Ce}\left(1 + \frac{Co}{Cp}\left(\frac{\sin(\omega_h t)}{\omega_h t} - 1\right)\right) \quad (26)$$

$$\Delta I_{v2}(t) = \frac{(Vm - Vo) \cdot tCe}{Ls \cdot Cp}\left(1 - \frac{\sin(\omega_h t)}{\omega_h t}\right), \quad (27)$$

$$\Delta I_{i2}(t) = \frac{\Delta Io \cdot t^2}{2 \cdot Ls \cdot Cp}\left(\left(1 - \frac{LoCo}{LsCp}\right) + \left(\frac{LoCo}{LxCs} - 1\right)\left(\frac{\sin^2\left(\frac{\omega_h t}{2}\right)}{\left(\frac{\omega_h t}{2}\right)^2}\right)\right) \quad (28)$$

and where $Cp = Co + Ce$; $Cs = \frac{Co \cdot Ce}{Co + Ce}$;
$Ls = (Lo + Lp + Ll)$; $Vm = Vs\max$; and $$\omega_h = 2\pi f2a = \frac{1}{\sqrt{Lx \cdot Cs}},$$

where $Lx = \frac{Lo \cdot (Lp + Ll)}{(Lo + Lp + Ll)}$.

$\Delta V_{v2}(t)$ and $\Delta I_{v2}(t)$ are the contributions to the variation in output voltage, $\Delta Vout_2(t)$, and the variation in current in the parasitic inductances 90, 91, $\Delta I2_2(t)$, respectively, due to the step i voltage at the filter input, and $\Delta V_{i2}(t)$ and $\Delta I_{i2}(t)$ are the contributions to the variation in output voltage, $\Delta Vout_2(t)$, and the variation in current in the parasitic inductances 90, 91 $\Delta I2_2(t)$, respectively, due to the step change in load current (note that $\Delta V_{i2}(t)$ is the same as Equation 22, although rearranged).

For Co equal to zero, the filter reduces to a single stage filter (Cp=Ce and F2a approaches infinity), the system 30 becomes identical to the system 20 of FIG. 7, and the equations (where the numerical subscripts (i.e. ΔVout₁) indicates a single stage filter) reduce to:

$$\Delta Vout_1(t) = \Delta V_{v1}(t) + \Delta V_{i1}(t) \quad (29)$$

$$\Delta I2_1(t) = \Delta I_{v1}(t) + \Delta I_{i1}(t) \quad (30)$$

where $$\Delta V_{v1}(t) = +\frac{(Vm - Vo) \cdot t^2}{2 \cdot Ls \cdot Ce}, \quad (31)$$

$$\Delta V_{i1}(t) = -\frac{\Delta Io \cdot t}{Ce} \quad (32)$$

$$\Delta I_{v1}(t) = \frac{(Vm - Vo) \cdot t}{Ls}, \quad (33)$$

$$\Delta I_{i1}(t) = \frac{\Delta Io \cdot t^2}{2 \cdot Ls \cdot Ce} \quad (34)$$

FIGS. 12A through 12C illustrate the effect of different values of Co. All of the figures show both the output voltage variation, $\Delta V_{out2}(t)$, and the variation in the current in the parasitic inductances, $\Delta I2_2(t)$, for the two stage filter, as well as the "ideal" variations, $\Delta V_{out1}(t)$ and $\Delta I2_1(t)$, for the (single stage) filter with Co=0. All of Figures use the following values in common: Ce=2000 microfarads; $\Delta Io$=20 Amperes; Vm−Vo=5 Volts; Lo=1 microhenry; and Lp+Ll=50 nanohenry. FIG. 12A shows the responses with Co=1 microfarad; FIG. 12B shows the responses with Co=5 microfarads; and FIG. 12C shows the responses with Co=200 microfarad. In all of the Figures the ideal response shows an essentially linear variation in current, $\Delta I2_1(t)$, which equals the change in current in the output inductor 80 induced by the step change in filter input voltage. The slope of the ideal current variation is, as predicted by Equations 30 and 33 (the effect of Equation 34 is negligible during the time period), 3.8 amperes-per-microsecond. The time of occurrence of the peak voltage variation, and the peak voltage variation itself, are, from solution of Equations 29, 31 and 32:

$$t1 = \frac{Ls \cdot \Delta Io}{Vm - Vo} = 4.2 \text{ microseconds} \quad (35)$$

and $$Vd = \frac{-Ls \cdot \Delta Io^2}{2 \cdot (Vm - Vo) \cdot Ce} = 21 \text{ millivolts}. \quad (36)$$

In FIG. 12A the current variation shows the sinusoidal oscillations predicted by Equations 27 and 28 at a second system breakpoint frequency f2a=729 Khz. The effect of this relatively high frequency current flowing in the large external capacitance has a negligible effect on the voltage variation. The voltage variation with Co=1 microfarad is essentially indistinguishable from the ideal case. In FIG. 12B, the second system breakpoint frequency, f2a=326 KHz, is lower due to the larger value of Co. The lower frequency oscillation in the current variation appears as a low-level distortion in the output voltage variation. In FIG. 12C, the relatively large value of Co (200 microfarads) results in a second system breakpoint frequency of 54 KHz, and gross distortion of both the current and voltage variations relative to the ideal case. In effect, values of Co result in a low second system breakpoint frequency which, relative to the time period under consideration, appears as a delay in the buildup of current in the parasitic inductances 90, 91 (by slowing the slew rate of the voltage, V1(t) (FIG. 9)). This delay retards recovery of the output voltage Vout(t). As Co is reduced the period of the increased second system breakpoint frequency becomes smaller relative to the time period under consideration and the current oscillation is "averaged" by the second stage of the filter.

Comparing Equation 25 with Equation 31, the variation in output voltage of the two stage filter in response to the step in voltage at the filter input can be related to the equivalent single stage filter response as follows:

$$\Delta V_{v2}(t) = \Delta V_{v1}(t) \cdot \frac{Ce}{Cp} \cdot \left(1 - \frac{\sin^2\left(\frac{\omega_h t}{2}\right)}{\left(\frac{\omega_h t}{2}\right)^2}\right). \quad (37)$$

Similarly, the variations in output voltages in response to the step in output current, Equations 26 and 32, are also related:

$$\Delta V_{i2}(t) = \Delta V_{i1}(t) \cdot \left(1 + \frac{Co}{Cp}\left(\frac{\sin(\omega_h t)}{\omega_h t} - 1\right)\right). \quad (38)$$

Equations 37 and 38 show that at any instant in time the output voltage response of the two stage filter to either a step in input voltage or a step in output current can be related to the equivalent single stage response by multiplying by the following "modulation factors":

$$R_v(t) = \frac{\Delta V_{v2}(t)}{\Delta V_{v1}(t)} = \frac{Ce}{Cp} \cdot \left(1 - \frac{\sin^2\left(\frac{\omega_h t}{2}\right)}{\left(\frac{\omega_h t}{2}\right)^2}\right) \quad (39)$$

$$R_i(t) = \frac{\Delta V_{i2}(t)}{\Delta V_{i1}(t)} = \left(\frac{Ce}{Cp} + \frac{Co}{Cp}\left(\frac{\sin(\omega_h t)}{\omega_h t}\right)\right), \quad (40)$$

where, as defined earlier, Cp=Co+Ce and $\omega_h = 2\pi$f2a. Thus, the response of the two stage filter can be expressed as $$\Delta V_{out2}(t) = \Delta V_{v1}(t).R_v(t) - \Delta V_{i1}(t).R_i(t). \quad (41)$$

The modulation factors, $R_v(t)$ and $R_i(t)$, are shown in FIG. 13. Both converge on a value of Ce/Cp as time increases, and the rise time of each is inversely proportional to the second system breakpoint frequency, f2a. Since, as indicated in Equation 21, the second system breakpoint frequency increases as Co decreases, the rise times will decrease as Co is decreased. Thus as Co is decreased toward zero, the rise time of both factors will grow shorter, each modulation factor will converge on a value of unity (since Cp=Co+Ce will approach a value of Ce), and the response Vout2(t) will converge on the single stage response Vout(t). $R_v(t)$ has the slower rise time, reaching its initial peak value at time $t_r$=1/f2a. With reference to Equation 41, if Co is small enough so that the factors $R_v(t)$ and $R_i(t)$ have essentially converged on their final values prior to the time at which the minimum value of the ideal response is reached (i.e. $t_r$ is shorter than the time t1 in Equation 35) then the effect of Co on the output response will be small or negligible. For example, in FIG. 12A, Co=1 microfarad, $t_r$=1.4 microseconds, t1=4.2 microseconds and the effect of Co is essentially insignificant. On the other hand, if t1 is less than $t_r$, then the effect of the modulation factors will be pronounced. In FIG. 12C, Co=200 microfarads, $t_r$=18.5 microseconds, t1=4.2 microseconds, and the effect of Co is gross distortion of the output voltage response.

Thus, if the value, Co, of the internal output capacitor 60 of the converter 120 of FIG. 9 is small enough so that $t_r$<t1 (Equation 35), then the converter 120 will exhibit an output voltage response to a change in load current which is essentially equivalent to the response of the voltage-compliant converter 110 of FIG. 7. Assuming that Co<<Ce, and Lo>>Lp+Ll, then, from Equation 21b, 1/f2a is essentially equal to $2\pi\sqrt{(Lp+Ll).Co}$, and the inequally 1/f2a<t1 can be expressed as:

$$2\pi \sqrt{(Lp + Ll) \cdot Co} < \frac{Ls \cdot \Delta Io}{Vm - Vo}, \quad (42)$$

$$Co < \frac{1}{(Lp + Ll) \cdot (2\pi(Vm - Vo))^2} (Ls \cdot \Delta Io)^2$$

Equation 42 can be considered as one condition for defining a voltage-compliant converter. Furthermore, if Ce were set to zero, the value for Co would be set so that it could not, by itself, be able to provide sufficient ripple filtering within the specified operating range of the converter. This condition will be satisfied if the first breakpoint frequency of the output filter 52, $$f1 = \frac{1}{2\pi \sqrt{LoCo}},$$

is greater than the minimum necessary operating frequency, fopmin, of the converter 120. Therefore another bound on Co is:

$$Co < \frac{1}{(2\pi fopmin)^2 Lo}. \quad (43)$$

In most cases the bound on Co defined by Equation 42 will be more restrictive than the bound defined in Equation 43. A converter module 120 of the kind shown in FIG. 9 which includes an internal output capacitor 60 whose value, Co, satisfies the two bounds defined in Equations 42 and 43 is a voltage-compliant converter module.

It is interesting to note that a value of Co which satisfies Equation 43 will, in practical cases, automatically satisfy closed-loop stability requirements. Referring to FIGS. 4 and 10, the first system breakpoint frequency, f1a (Equations 21a, 21c), is determined by the desired amount of ripple attenuation at the lowest converter operating frequency, fopmin, and is generally set to value equal to a fraction of fopmin. The values of the output inductor 80, Lo, and the minimum value of the external output capacitor 160, Ce, are selected to simultaneously satisfy both the first system breakpoint frequency requirement and requirements relative to maximum allowable output voltage deviation (i.e. Equation 8). This minimum value of Ce will determine the maximum value of cutoff frequency, fcmax (use of larger values of Ce will result in lower values of f1 and fc). To ensure closed loop system stability, the value of the internal output capacitor 60, Co, must not result in a second system breakpoint frequency, f2a (Equations 21b, 21d), less than fcmax. Thus, from Equation 21b, (and assuming that Ce>>Co and that Lo>>)Lp+L1)):

$$Co < \frac{1}{(2\pi fcmax)^2 (Lp + Ll)}. \quad (44)$$

Noting again that fcmax is generally limited to being less than one-half of fopmin due to sampling effects, a value of Co which satisfies Equation 43 will violate Equation 44 only if the sum of the parasitic inductances, Lp+Ll, is four or more times the value of the output inductance, Lo. This is unlikely in practice.

For simplicity, parasitics associated with the output capacitor have been neglected in the preceding discussions and examples. In practice, the output capacitor will have some parasitic inductance and resistance, as shown in FIG. 14. In the Figure, the capacitor 160 is shown to be composed of a pure capacitance 161, of value Ce, in series with both an equivalent series inductance (ESL) 162, of value Ls, and an equivalent series resistance (ESR) 163, of value Rs. If the external output capacitor 160 in the system 20 of FIG. 7 includes an ESL and ESR as shown in FIG. 14, then the output voltage response to the change in load current will be different than shown in FIG. 8. With reference to FIGS. 8A and 14, the rate of change of current between times t1 and t2 will produce an additional voltage drop across the ESL equal to $$V_{LE}(t) = Ls \frac{dIout(t)}{dt} = D \cdot Ls \quad t1 < t < t2, \quad (45)$$

and the current flowing in the ESR will produce an additional voltage drop of $$V_{RE}(t) = (Iout(t) - Io) \cdot Rs \quad t1 < t. \quad (46)$$

Thus, the total output deviation for the systems of FIGS. 7 or 9 at t=t1 would be given by Equation 45, and the total deviation at t=t2 would be (from Equations 20, 45, 46)

$$Vd = \frac{D}{2Ce}(t2 - t1)^2 + D \cdot Ls + (I1 - Io) \cdot Rs. \quad (47)$$

Use of tantalum or ceramic capacitors can minimize these effects, as both exhibit relatively low values of ESL and ESR. Paralleling N capacitors, each having a capacitance value Ce, an ESL=Ls, and an ESR=Rs will result in an aggregate capacitance of N·Ce, and a reduction in overall parasitics to ESL=Ls/N and ESR=Rs/N. In practice, a 2400 μF external output capacitor was implemented (for use with a 150 W voltage-compliant DC-DC converter module) using twenty-four low-cost 100 μF tantalum surface-mount devices. The overall device occupies a volume less than 2.5"×0.375"×0.5" and exhibits an aggregate ESR of 4 milliohms and an aggregate ESL of 2.5 nanohenries. With the load current waveform of FIG. 8A, and values used in preceding examples (D=20 Amperes-per-microsecond, t2−t1=1 microsecond; I1−Io=20 Amperes), Equation 45 indicates that an ESL of 2.5 nanohenries would increase the output voltage drop by a constant 0.05 V between times t1 and t2, and an ESR of 4 milliohms would contribute an additional voltage drop which would increase linearly from 0 V, at time t1, to 0.08 V at time t2 (it is to be noted that these increases in output voltage drop would apply equally to the system 10 of FIG. 5, the system 20 of FIG. 7, and the system 30 of FIG. 9). The total deviation in output voltage for the system of FIGS. 7 and 9 would be 0.05 V at time t1 (Equation 45) and 0.13 V at time t2 (Equation 47). In general, the effects of output capacitor parasitics can be managed economically by using a quantity of appropriate devices. Capacitor selection will be based upon the amount of bulk capacitance required, which can be estimated using Equation 8, and Equations 45 through 47, which can be used to estimate allowable limits on capacitor parasitics, Ls and Rs.

Other embodiments are within the following claims. For example, some or all of the output inductance, Lo, may be placed external to the converter module.

What is claimed is:

1. A voltage-compliant power converter module which converts power from an input source for delivery to a load, said load being external to said voltage-compliant power converter module and including an external filter capacitance of value Ce for providing ripple filtering of the load voltage delivered to said load, said load being corrected to said voltage-compliant power converter module via load interconnections external to said voltage-compliant power converter module, said load interconnections being characterized by a total parasitic load inductance of value Ll, said voltage-compliant power converter module comprising input terminations for connection to said input source, output terminations for connection to said load interconnections, switching power conversion circuitry connected to receive input power via said input terminations from said input source, said power conversion circuitry including one or more switching devices, said switching devices delivering a pulsating voltage waveform at switching frequencies within a nominal operating range, power delivery circuitry for receiving said pulsating voltage waveform from said switching power conversion circuitry and delivering power to said loads via said output terminations and said load interconnections, said power delivery circuitry including an output capacitor, of value Co, an output inductor, of value Lo, and output interconnections between said output capacitor and said output terminations, said output interconnections and said output terminations being characterized by a total parasitic output inductance of value Lp, said output inductor, said external filter capacitor, said output capacitor, said parasitic load inductance and said parasitic output inductance defining a first breakpoint frequency, f1, given by the expression on the right side of the following equality:

$$f1 = \frac{1}{2\pi \sqrt{(Lo + Lp + Ll) \cdot (Co + Ce)}}$$

which is lower than the lowest switching frequency in the nominal operating range, the output capacitance, Co, of said output capacitor included within said power delivery circuitry being less and (a) the expression on the right side of the following inequality:

$$Co < \frac{1}{(Lp + Ll)} \cdot \frac{(Ls \cdot \Delta Io)^2}{(2\pi(Vm - Vo))^2},$$

and (b) the expression on the right side of the following inequality:

$$Co < \frac{1}{(2\pi fopmin)^2 Lo}$$

wherein Vo is the output voltage, Io is the load current, Vm is the maximum input filter voltage, fopmin is the maximum operating frequency, and Ls=Lo+Lp−Ll.

2. The voltage-compliant power converter module of claim 1 further comprising control circuitry for setting the average value of said pulsating voltage waveform by controlling the switching of said switching devices based on the value of an electrical parameter delivered to said control circuitry.

3. The voltage-compliant converter module of claim 2 further comprising sense terminations for delivering said electrical parameter to said control circuitry.

4. The voltage-compliant power converter of claim 2 or 3 wherein said controller sets the average value of the pulsating voltage waveform delivered by said switching devices to said power delivery circuitry based upon a comparison of a setpoint voltage, Vsp, to an electrical parameter delivered to said controller, said electrical parameter being indicative of said load voltage.

5. The converter of claim 1 wherein said output capacitance is zero.

6. The voltage-compliant power converter module of claim 1 wherein some or all of said output inductance, Lo, is external to said converter module.

7. A voltage-compliant power converter system comprising an input power source, a load, a voltage-compliant power converter which converts power from an input source for delivery to said load, said load being external to said voltage-compliant power converter and including an external filter capacitance of value Ce for providing ripple filtering of the load voltage delivered to said load, said load being connected to said voltage-compliant power converter via load interconnections external to said voltage-compliant power converter, said load interconnections being characterized by a total parasitic load inductance of value Ll, said voltage-compliant power converter comprising input terminations for connection to said input power source, output terminations for connection to said load interconnections, switching power conversion circuitry connected to receive input power via said input terminations from said input power source, said power conversion circuitry including one or more switching devices, said switching devices delivering a pulsating voltage waveform at switching frequencies within a nominal operating range, power delivery circuitry for receiving said pulsating voltage waveform from said switching power conversion circuitry and delivering power to said loads via said output terminations and said load interconnections, said power delivery circuitry including an output capacitor, of value Co, an output inductor, of value Lo, and output interconnections between said output capacitor and said output terminations, said output interconnections and said output terminations being characterized by a total parasitic output inductance of value Lp, said output inductor, said external filter capacitor, said output capacitor, said parasitic load inductance and said parasitic output inductance defining a first breakpoint frequency, f1, given by the expression on the right side of the following equality:

$$f1 = \frac{1}{2\pi \sqrt{(Lo + Lp + Ll) \cdot (Co + Ce)}}$$

which is lower than the lowest switching frequency in the nominal operating range, the output capacitance, Co, of said output capacitor included within said power delivery circuitry being less and (a) the expression on the right side of the following inequality:

$$Co < \frac{1}{(Lp + Ll) \cdot (2\pi(Vm - Vo))^2} (Ls \cdot \Delta Io)^2 ,$$

and (b) the expression on the right side of the following inequality:

$$Co < \frac{1}{(2\pi fopmin)^2 Lo}$$

wherein Vo is the output voltage, Io is the load current, fopmin is the maximum operating frequency, and $Ls = Lo + Lp + Ll$.

8. The voltage-compliant power converter module of claim 7 further comprising control circuitry for setting the average value of said pulsating voltage waveform by controlling the switching of said switching devices based on the value of an electrical parameter delivered to said control circuitry.

9. The voltage-compliant power converter module of claim 8 further comprising sense terminations for delivering said electrical parameter to said control circuitry.

10. The voltage-compliant power converter of claim 8 or 9 wherein said controller sets the average value of the pulsating voltage waveform delivered by said switching devices to said power delivery circuitry based upon a comparison of a setpoint voltage, Vsp, to an electrical parameter delivered to said controller, said electrical parameter being indicative of said load voltage.

11. The converter of claim 7 wherein said output capacitance is zero.

12. The voltage-compliant power converter module of claim 7 wherein some or all of said output inductance, Lo, is external to said converter module.

* * * * *

UNITED STATES PATENT AND TRADEMARK OFFICE
CERTIFICATE OF CORRECTION

PATENT NO. : 5,088,016
DATED : February 11, 1992
INVENTOR(S) : Patrizio Vinciarelli et al.

It is certified that error appears in the above-indentified patent and that said Letters Patent is hereby corrected as shown below:

In Claim 1, column 21, line 63: line 64: change "Lp-Ll" to --Lp+Ll--. [Examiner's Amendment]

In claim 7, column 23, lines 17 & 18, after "current," insert --$V_m$ is the maximum input filter voltage--

Signed and Sealed this

Nineteenth Day of November, 1996

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,088,016
DATED : February 11, 1992
INVENTOR(S) : Patrizio Vinciarelli et al.

It is certified that error appears in the above-identified patent and that said Letters Patent is hereby corrected as shown below:

In Claim 1, column 21, line 63: change "maximum" to --minimum--.

In Claim 1, column 21, line 63: line 64: change "Lp-Ll" to --Lp+Ll--.

In Claim 7, column 23, line 17: change "maximum" to --minimum--.

In claim 7, column 23, lines 17 & 18, After Current, insert --Vm is the maximum input filter voltage--, This Certificate supersedes Certificate of Correction issued November 19, 1996.

Signed and Sealed this

Seventh Day of December, 1999

Attest:

Q. TODD DICKINSON

*Attesting Officer*     *Acting Commissioner of Patents and Trademarks*